United States Patent
Shimano et al.

(10) Patent No.: US 7,609,951 B2
(45) Date of Patent: Oct. 27, 2009

(54) IMAGE PICKUP PROCESSING METHOD AND IMAGE PICKUP APPARATUS

(75) Inventors: Mihoko Shimano, Tokyo (JP); Takeo Azuma, Nara (JP); Jun Ozawa, Nara (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 11/955,792

(22) Filed: Dec. 13, 2007

(65) Prior Publication Data

US 2008/0137983 A1    Jun. 12, 2008

Related U.S. Application Data

(62) Division of application No. 10/529,296, filed as application No. PCT/JP2004/002229 on Feb. 25, 2004, now Pat. No. 7,329,057.

(30) Foreign Application Priority Data

Feb. 25, 2003    (JP) .............................. 2003-047319

(51) Int. Cl.
  *G03B 17/00*    (2006.01)
  *G06K 9/36*    (2006.01)
(52) U.S. Cl. ...................... 396/54; 396/439; 348/222.1; 382/286
(58) Field of Classification Search .................... 396/54, 396/55, 439; 348/208.2, 208.12, 222.1, 335, 348/207.99; 382/173, 275, 286, 289
See application file for complete search history.

(56) References Cited

U.S. PATENT DOCUMENTS

| 5,396,336 A | 3/1995 | Yoshii et al. |
| 5,561,498 A * | 10/1996 | Sekine et al. ................. 396/53 |
| 5,749,002 A | 5/1998 | Iwasaki |

FOREIGN PATENT DOCUMENTS

| JP | 4-314274 | 11/1992 |
| JP | 05-219420 | 8/1993 |
| JP | 06-105194 | 4/1994 |
| JP | 06-311425 | 11/1994 |
| JP | 09-236839 | 9/1997 |
| JP | 2002-209221 | 7/2002 |

OTHER PUBLICATIONS

Hidekazu Ohmi et al., "Image Inclination Measurement Based on Edge Directions and an Analysis of Relation between Visual Inclination", MVA2002 IAPR Workshop on Machine Vision Application, Dec. 11-13, 2002.

* cited by examiner

*Primary Examiner*—William B. Perkey
(74) *Attorney, Agent, or Firm*—Harness, Dickey & Pierce, P.L.C.

(57) ABSTRACT

A roll correction section (21) performs correction to an image captured by a camera (11). A region limiting section (15) limits image data of an image in an upper region of the image and outputs the image data and a roll amount detection section (13) detects, from the limited and output image data, a roll amount of the image. A roll correction section (21) performs correction based on the detected roll amount.

1 Claim, 20 Drawing Sheets (a) Front view  (b) Side view

FIG. 17
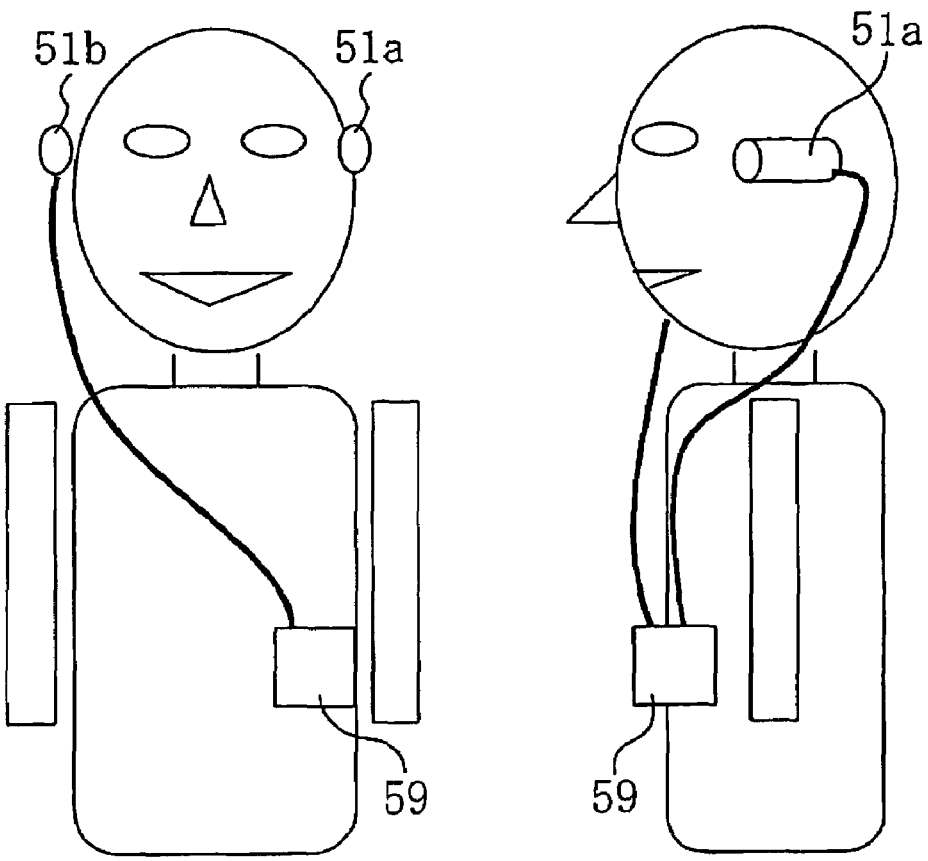
(a) Front view          (b) Side view
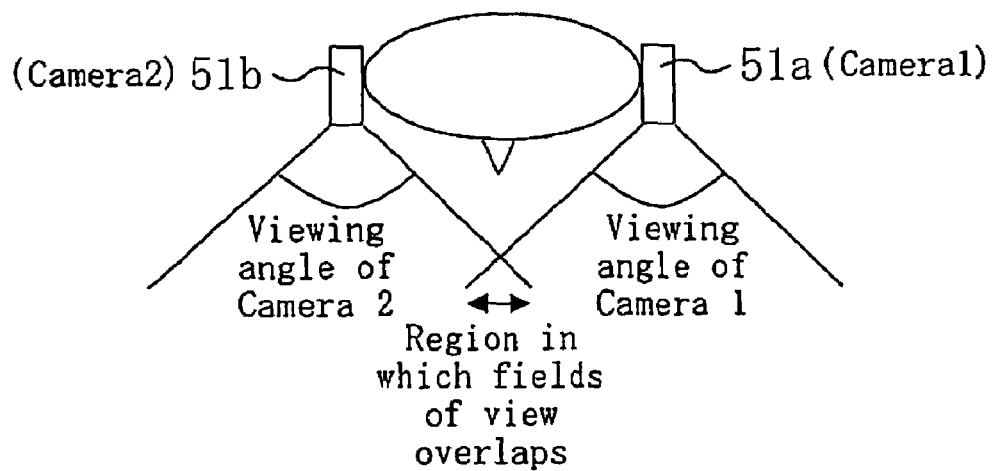
(c) View from above FIG. 19
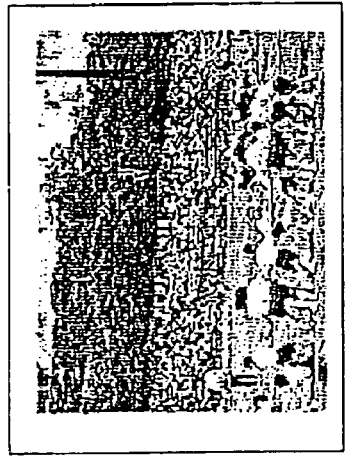
Image captured by Camera 2 (after correction)
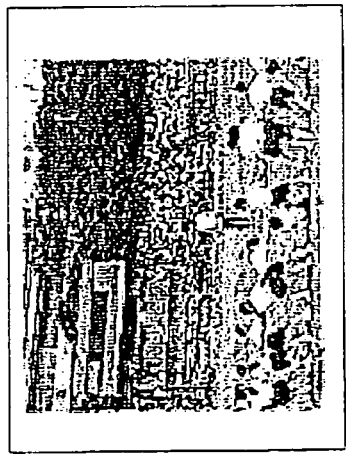
Image captured by Camera 1 (after correction)
Image after synthesis FIG. 22
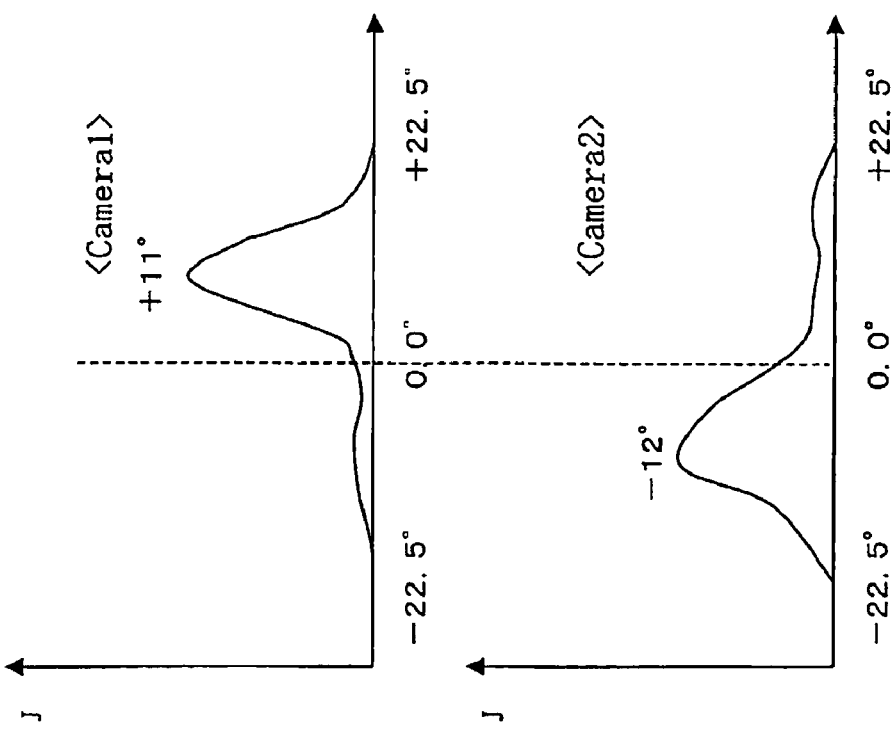
(b) Face in different directions
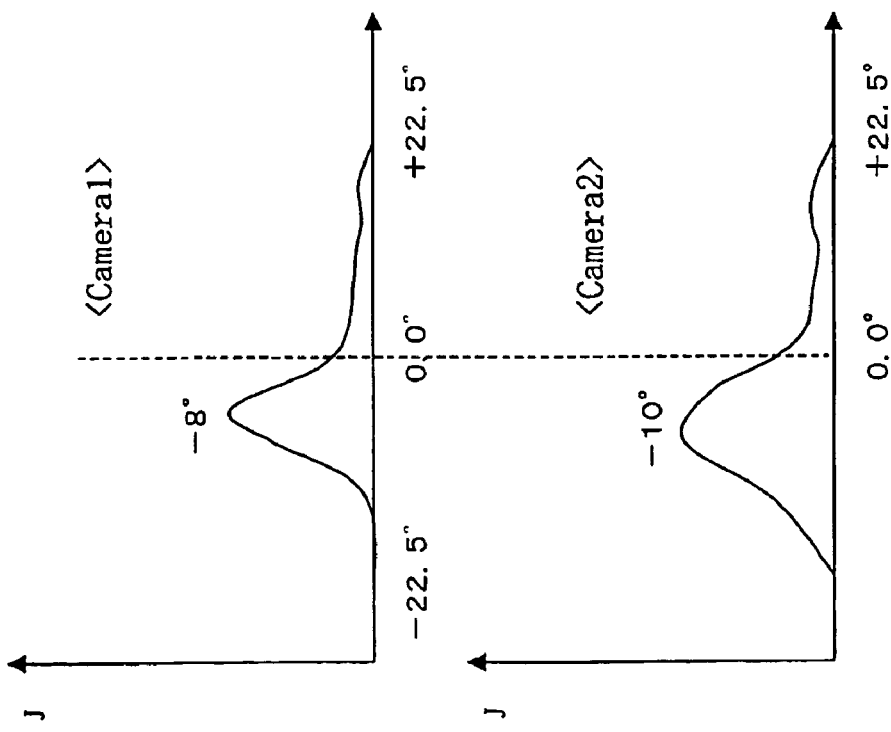
(a) Face in the same direction FIG. 23
(a) No synthesis should be performed
 
(b) Synthesis should be performed
 
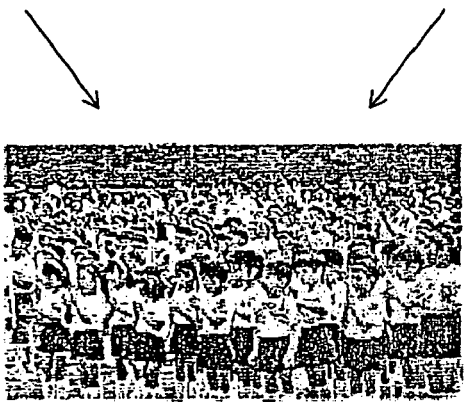

FIG. 24
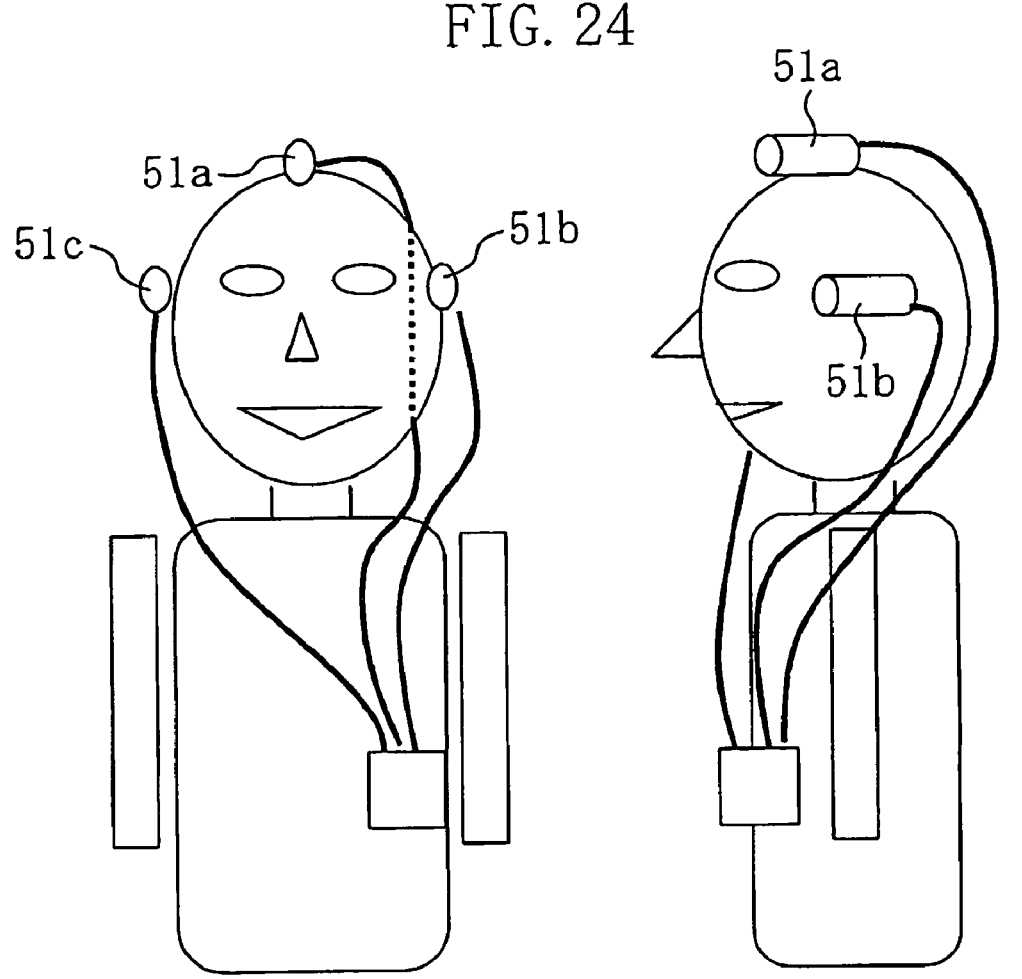
(a) Front view    (b) Side view
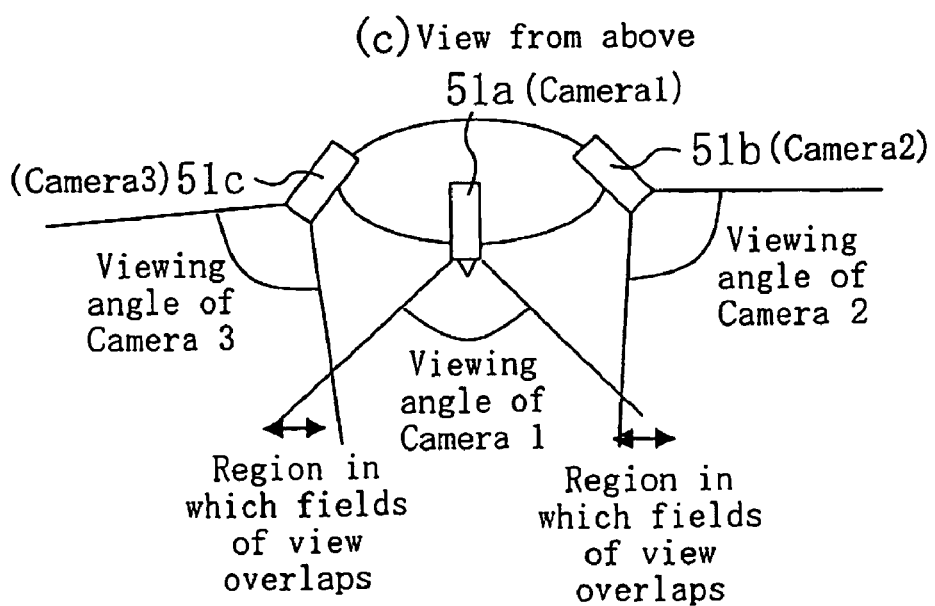
(c) View from above (b) Front side  (a) Back side FIG. 27
(a) <Camera1>
<Camera2>
(b) Before correction
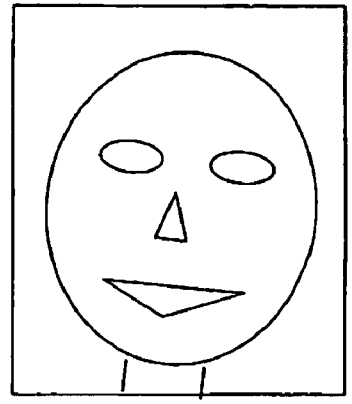
(c) After correction
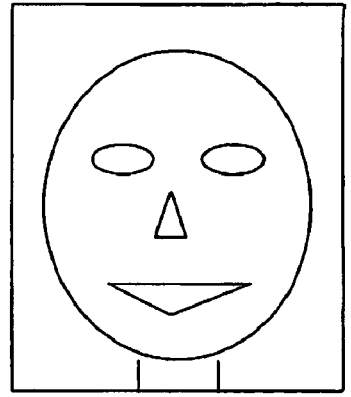

IMAGE PICKUP PROCESSING METHOD AND IMAGE PICKUP APPARATUS

CROSS-REFERENCE TO RELATED APPLICATIONS

This application is a divisional of U.S. patent application Ser. No. 10/529,296 filed on Mar. 25, 2005, which is a national stage of WO application number PCT/JP2004-002229, filed Feb. 25, 2004. The disclosure of the above application is incorporated herein by reference. This application claims the benefit of Japanese Patent Application No. 2003-047319, filed Feb. 25, 2003.

TECHNICAL FIELD

The present invention relates to an image processing technique for capturing an image by a camera and performing correction, based on feature data detected from a captured image.

BACKGROUND ART

Conventionally, techniques for eliminating the inclination of a camera have been proposed. In such techniques, an inclination of a camera is reduced by extracting edges in an image, and then, assuming that the inclination of an edge having the largest length is the inclination of the camera, affine transform is performed to image data to eliminate the inclination of the edge having the largest length (e.g., see Patent Reference 1).

Moreover, a technique for extracting a vertical edge in an image and detecting an inclination of the image from the vertical edge is disclosed in Non-patent Reference 1.

(Patent Reference 1) Japanese Laid-Open Publication No. 4-314274 (Page 2, FIG. 1)

(Non-patent Reference 1) Hidekazu Ohmi and Fumihiko Saitoh, "Image Inclination Measurement Based on Edge Directions and an Analysis of Relation between Visual Inclination", MVA2002 IAPR Workshop on Machine Vision Application, Dec. 11-13, 2002.

Problems that the Invention is to Solve

In image capturing, an image is normally captured in illumination from above. Therefore, the ground, the floor or the like often comes out in a lower portion of the image. If processing such as roll correction and backlight correction is performed to such an image based on feature data of the entire image, desired correction effects can not be achieved in many cases.

For example, in roll correction of an image for making perpendicular edges of an artificial object be vertical in the image, when detection of edges is performed in the entire image, the floor or the ground comes out under the object and thus roll correction is influenced by edges contained in the image of the floor or the ground. Therefore, roll correction might not be properly performed.

Moreover, in exposure correction such as backlight correction, it is highly possible that intensity distribution is largely different between an upper portion and a lower portion of the image. Therefore, when feature data of the entire image is used, there may be cases where desired correction effects can not be achieved.

In view of the above-described problems, it is therefore an object of the present invention to make it possible to execute correction of an image captured by a camera in a more proper manner than in the known techniques.

DISCLOSURE OF INVENTION

The present invention is directed to obtaining feature data for use in correction of an image not from an entire image but from an upper portion of the image. The present invention has been devised in consideration that in a normal captured image, an image capturing state such as characteristics of an imaged subject is different between upper and lower portions of the image. For example, in roll correction using a perpendicular edge, a region in which a perpendicular edge element is obtained is limited to an upper portion of an image, thereby allowing elimination of influences of an edge in the floor or the ground. Moreover, in exposure correction such as backlight correction, a region in which an intensity value is obtained is limited to an upper portion of an image, thereby allowing elimination of influences of a region which is hardly exposed to illumination from above.

That is, the present invention provides, as an image capturing processing method, a method in which an image is captured by a camera, feature data of the image is detected in an upper region of the captured image, a correction amount is calculated from the feature data, and then, based on the calculated correction amount, correction control of an optical system of the camera or correction of the image data is performed.

Moreover, the present invention provides, as an image capturing system, a system including a camera for capturing an image, a region limiting section for limiting image data of an image captured by the camera to an upper region of the image and outputting the limited image data, a correction amount calculation section for detecting, from the limited image data output from the region limiting section, feature data of the image and calculating a correction amount from the feature data, and a correction section for performing, based on a correction amount calculated by the correction amount calculation section, correction control of an optical system of the camera or correction of the image.

According to the present invention, a correction amount is calculated based on feature data detected not from an entire captured image but from an upper region of the image, and correction control of an optical system of a camera or correction of image data is performed based on the calculated correction amount. Thus, information to be noise is removed in advance during calculation of a correction amount, so that a more proper correction amount can be calculated. Accordingly, correction of an inclination and a motion of an image can be executed more accurately.

In this case, as a simple example, the upper region means to be approximately upper half of the entire region of an image. Moreover, the upper region may be a rectangular or oval region contained in the approximately upper half of the entire region. Alternatively, the upper region may be a region of which barycentric position is located higher than a predetermined threshold (e.g., a center position of the entire image) among regions obtained by dividing the image by a known segmentation method.

Moreover, in exposure control, an intensity value may be taken into consideration when an upper region setting is made. For example, a region in which an intensity value is a predetermined threshold or more in the above-described upper region may be set as an upper region, and a region of which barycentric position is located higher than a predetermined threshold (e.g., a center position of the entire image) in the region in which an intensity value is a predetermined threshold or more may be an upper region.

BRIEF DESCRIPTION OF DRAWINGS

FIG. 17 is an illustration of an exemplary application form of the fifth embodiment of the present invention.

FIG. 19 illustrates an example of image synthesis according to the fifth embodiment of the present invention.

FIG. 22 shows graphs conceptually illustrating judgment of whether or not image synthesis can be performed according to the sixth embodiment of the present invention.

FIG. 23 shows an example of image synthesis according to the sixth embodiment of the present invention.

FIG. 24 is an illustration of another exemplary application form of the sixth embodiment of the present invention.

FIG. 27 shows an example of roll correction according to the seventh embodiment of the present invention.

BEST MODE FOR CARRYING OUT THE INVENTION

Figure 1:
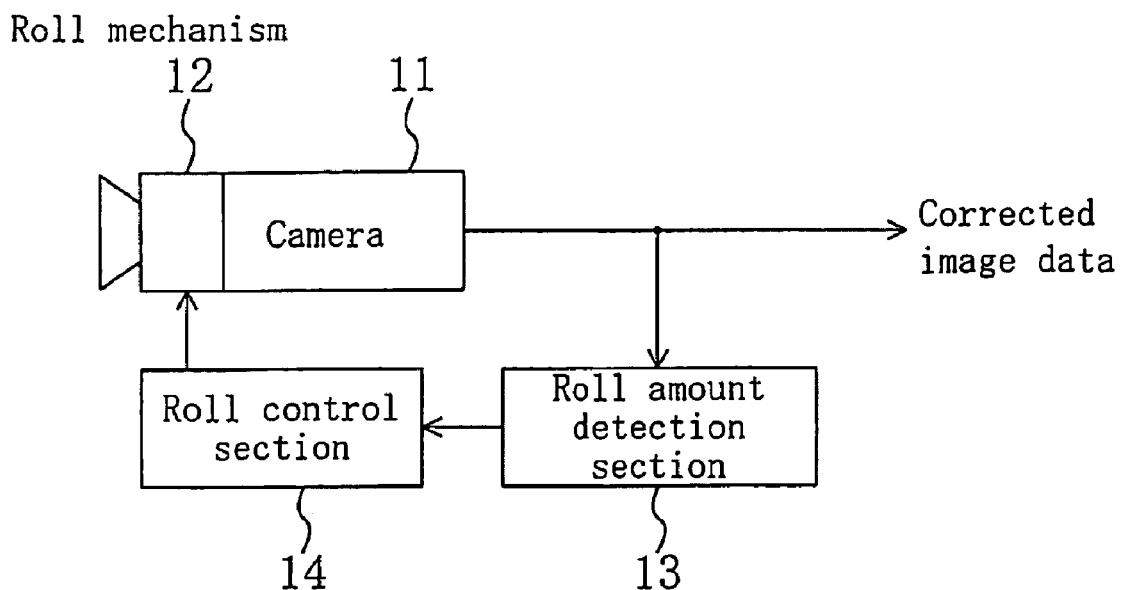
FIG. 1 is a block diagram illustrating the configuration of an image capturing system according to a first embodiment of the present invention.

In a first aspect of the present invention, as an image capturing processing method, provided is a method including: a first step of capturing an image by a camera; a second step of detecting, in an upper region of the image captured in the first step, feature data of the image and calculating a correction amount from the feature data; and a third step of performing, based on the correction amount calculated in the second step, correction control of an optical system of the camera or correction of image data of the image.

According to a second aspect of the present invention, provided is an image capturing processing method of the first aspect, in which the second step includes the steps of: extracting a perpendicular edge element in the upper region; detecting, as the feature data, a roll amount of the image based on the perpendicular edge element; and calculating a roll correction amount of the image based on the roll amount.

According to a third aspect of the present invention, provided is an image capturing processing method of the second aspect, in which in the second step, the roll correction amount is calculated using a roll amount at a current time and a roll amount at a previous time.

According to a fourth aspect of the present invention, provided is an image capturing processing method of the second aspect, in which the second step includes the steps of: detecting, in addition to the roll amount, a motion vector as the feature data in the upper region; and calculating a motion correction amount of the image based on the motion vector.

According to a fifth aspect of the present invention, provided is an image capturing processing method of the first aspect, in which the second step includes the steps of: obtaining an intensity in the upper region, detecting an exposure state of the image, as the feature data, based on the obtained intensity; and calculating an exposure correction amount based on the exposure state.

According to a sixth aspect of the present invention, provided is an image capturing processing method of the fifth aspect, in which the exposure correction is backlight correction or excessive forward light correction.

According to a seventh aspect of the present invention, provided is an image capturing processing method of the first aspect further including: a fourth step of detecting an attitude of the camera; and a fifth step of adjusting a range of the upper region in the second step according to the camera attitude detected in the fourth step.

According to an eighth aspect of the present invention, provided is an image capturing processing method of the seventh aspect, in which in the fourth step, data for the detected attitude of the camera is smoothed in a time direction.

According to a ninth aspect of the present invention, as an image capturing processing method, provided is a method including: a first step of capturing images by a plurality of cameras, respectively; a second step of detecting, in an upper region of each of the images captured in the first step, a roll amount of the image; a third step of synthesizing respective roll amounts of the images detected in the second step; a fourth step of performing, based on a synthesis roll amount obtained in the third step, roll correction to each of the images; and a fifth step of synthesizing the images to which roll correction has been performed in the fourth step to obtain a synthesized image.

According to a tenth aspect of the present invention, as an image capturing processing method, provided is a method including: a first step of capturing images by a plurality of cameras, respectively; a second step of detecting, in an upper region of each of the images captured in the first step, a roll amount of the image; a third step of judging, from respective roll amounts of the images detected in the second step, whether to synthesize the images; and a fourth step of synthesizing, if it is judged that synthesis should be performed in the third step, the images to obtain a synthesized image.

According to an eleventh aspect of the present invention, as an image capturing processing method, provided is a method including: a first step of capturing images by first and second cameras, respectively; a second step of detecting, in an upper region of a first image captured by the first camera in the first step, a roll amount of the first image; and a third step of performing, based on a roll amount detected in the second step, roll correction to a second image captured by the second camera.

According to a twelfth aspect of the present invention, as an image capturing system, a system including: a camera for capturing an image; a region limiting section for limiting image data of an image captured by the camera to an upper region of the image and outputting the limited image data; a correction amount calculation section for detecting, from the limited image data output from the region limiting section, feature data of the image and calculating a correction amount from the feature data; and a correction section for performing, based on a correction amount calculated by the correction amount calculating section, correction control of an optical system of the camera or correction of the image.

Hereinafter, embodiments of the present invention will be described with reference to the accompanying drawings.

FIRST EMBODIMENT

FIG. 1 is a block diagram illustrating the configuration of an image capturing system according to a first embodiment of the present invention. In FIG. 1, a camera 11 includes a lens and an imaging device. The camera 11 photoelectric-transforms a subject image obtained through the lens using an imaging device, thereby generating image data. A roll mechanism 12 rotates an optical system of the camera 11. A roll amount detection section 13 detects a roll amount of image data output from the camera 11 with respect to the horizontal direction and then calculates a roll correction amount. A roll control section 14 performs roll control of the roll mechanism 12, based on the roll correction amount detected by the roll amount detection section 13.

When the vertical direction of a landscape which has been captured in the image data does not match the vertical direction in an actual space, the image capturing system of FIG. 1 performs roll correction of the image data so that the respective vertical directions of the landscape and the actual space match each other. That is, the image capturing system corrects an inclination of the image using a vertical edge. This is because, for example, when an image is captured without straightly facing an artificial object, a horizontal edge looks inclined in the image while a vertical edge looks approximately vertical.

Figure 2:
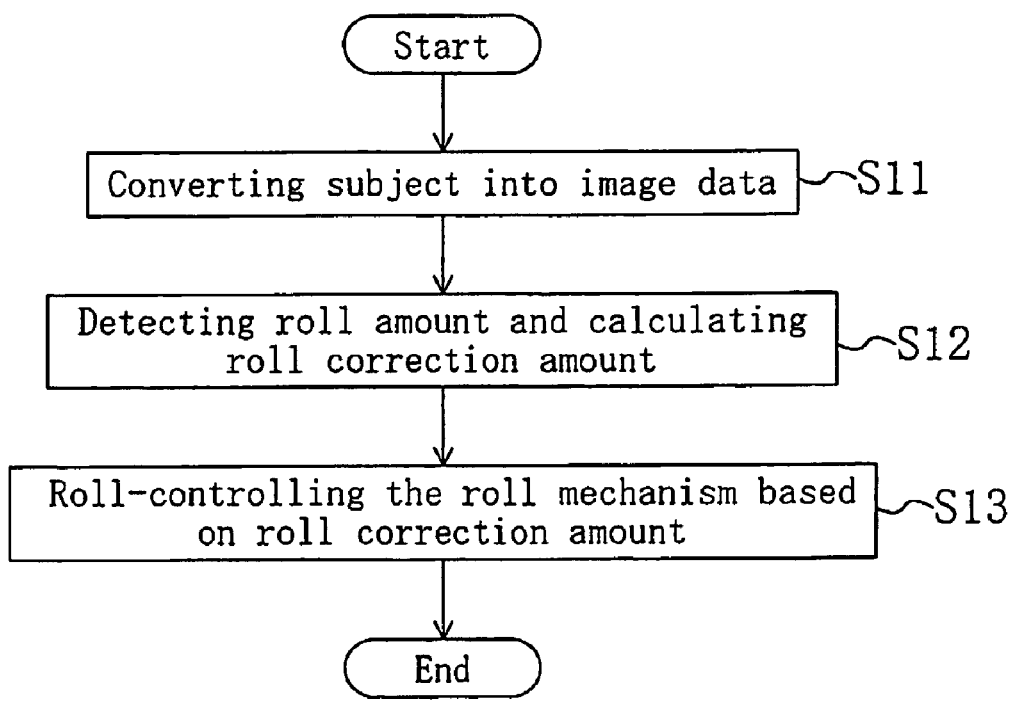
FIG. 2 is a flowchart illustrating the operation of the image capturing system of FIG. 1.

The operation of the configuration of FIG. 1 will be described with reference to a flowchart of FIG. 2.

Figure 3:
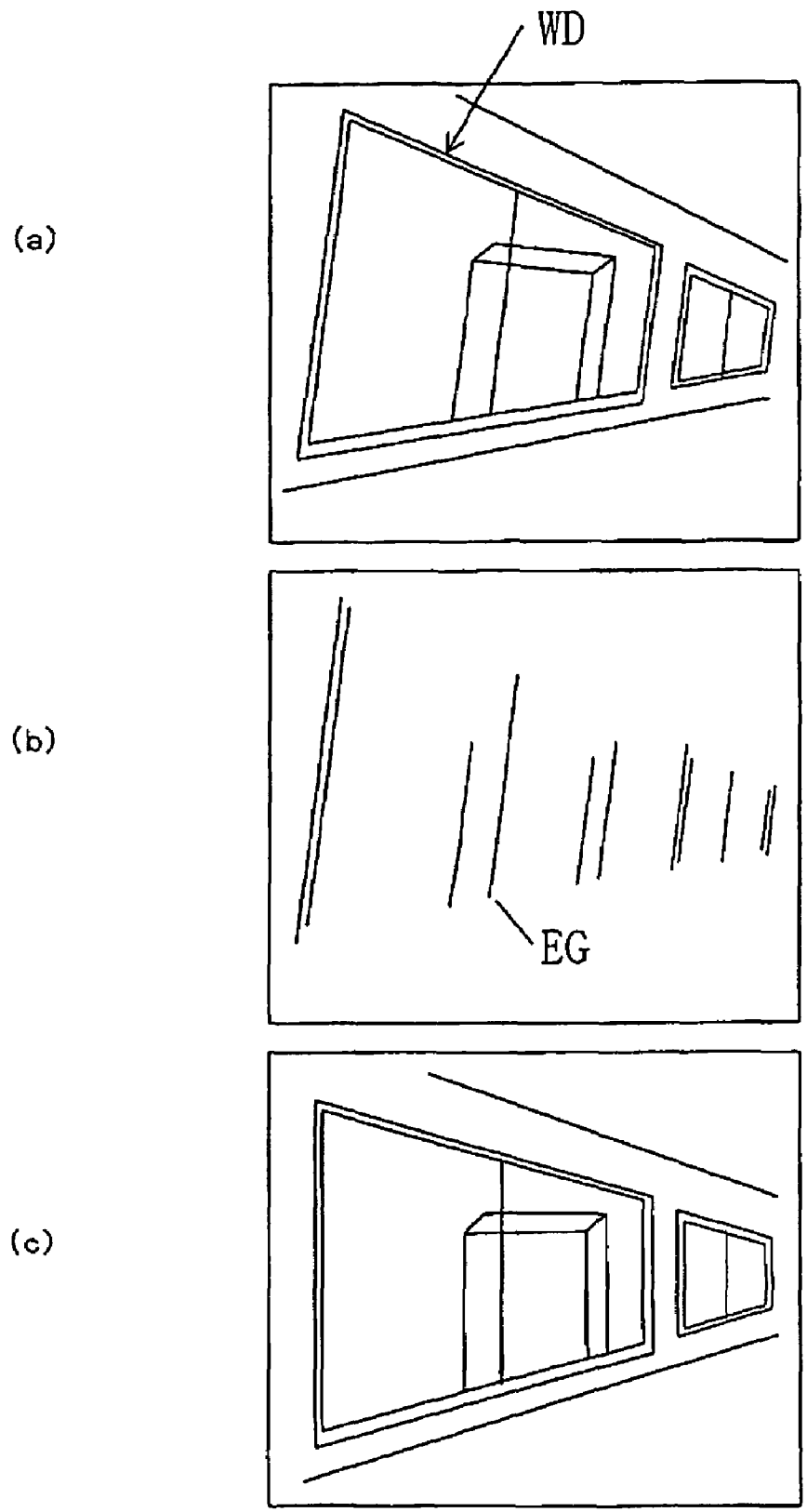
FIG. 3(a) is a view illustrating an image before correction.
FIG. 3(b) is a view illustrating vertical edges extracted from the image of FIG. 3(a)
FIG. 3(c) is a view illustrating an image after correction.

First, the camera 11 transforms a subject into image data (S11). In this case, as shown in FIG. 3(a), a window WD of a building as a subject is captured from the oblique direction without straightly facing the window WI). In the image data of FIG. 3(a), each of horizontal and vertical edges of the window WD is inclined. The inclination of the horizontal edge is due not to straightly facing the object. The inclination of the vertical edge is due to roll of the camera 11 on the optical axis direction.

Next, the roll amount detection section 13 extracts an edge close to the vertical direction and detects a roll amount so as to adjust the direction of the edge to the perpendicular direction. And the section 13 calculates, from the roll amount, a roll correction amount for actually roll-controlling the roll mechanism 12 (S12). FIG. 3(b) is a view illustrating an edge EG extracted from the image data of FIG. 3(b).

Then, the roll control section 14 performs roll control of the roll mechanism 12, based on the obtained roll correction amount. Thus, properly roll-corrected image data can be obtained as shown in FIG. 3(c).

Hereinafter, a method for obtaining the roll correction amount using a vertical edge element will be described.

Figure 4:
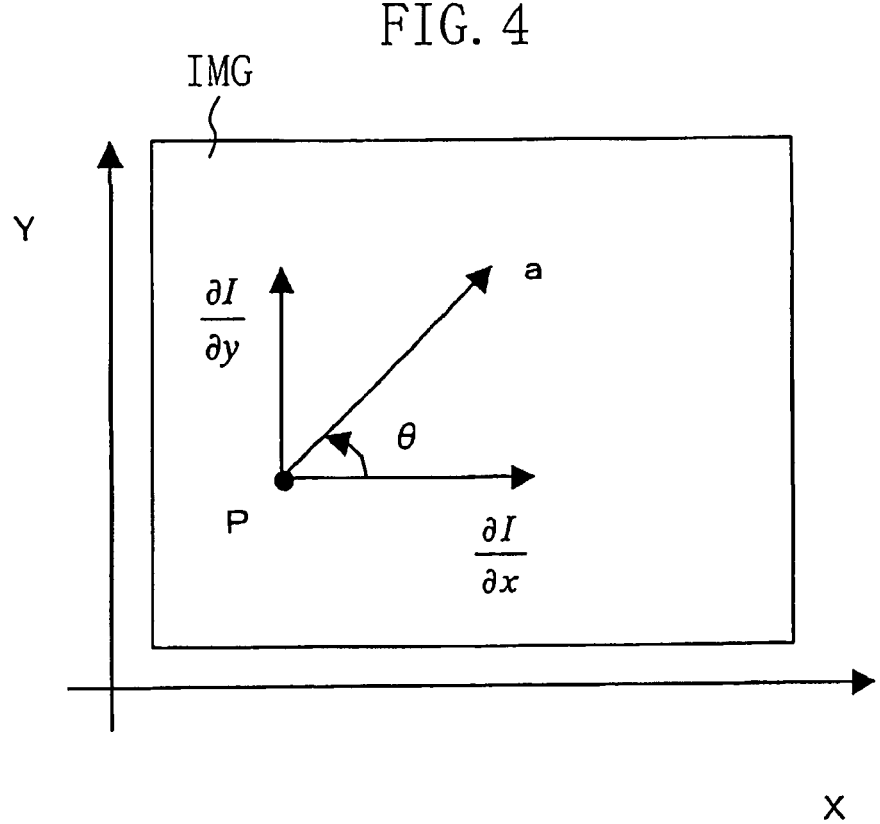
FIG. 4 is a graph showing image data in the xy coordinate system.

FIG. 4 is a graph showing image data IMG transformed in the xy coordinate system. In this case, P is a pixel in the image data IMG, I is the intensity of the image data, a is a unit direction vector showing an edge element of the pixel P, and θ is an angle of the unit direction vector a to the positive direction of the x axis.

The directional derivative of the intensity I in coordinate values (x, y) of the pixel P is expressed by Equation 1, based on respective derivative values in the horizontal and vertical directions and the unit direction vector a (cos θ, sin θ).

$$\frac{\partial I}{\partial a} = \frac{\partial I}{\partial x}\cos\theta + \frac{\partial I}{\partial y}\sin\theta \qquad \text{[Equation 1]}$$

In this case, let an evaluation function J be the sum of directional derivative with respect to the direction of the unit direction vector a in each pixel. Then, J can be expressed by Equation 2.

$$J = \sum_{\theta \in \Theta}\left(\frac{\partial I}{\partial a}\right)^2 \qquad \text{[Equation 2]}$$

In Equation 2, θ∈Θ means that a subject to be processed is limited. In this embodiment, the subject to be processed is limited to a pixel having an edge in the approximately vertical direction. For example, the edge direction is limited within ±45 degrees to vertical. In this case, the edge direction and the derivative direction are perpendicular to each other and thus the derivative direction is limited within ±45 degrees to horizontal. Therefore, the pixel needs to satisfy Equation 3.

$$\frac{\partial I}{\partial x} \geq \frac{\partial I}{\partial y} \qquad \text{[Equation 3]}$$

Then, by calculating an angle at which the evaluation function J is maximum from a pixel satisfying Equation 3 and Equation 4, the roll amount of the image data can be calculated from an edge in the approximately vertical direction.

$$\frac{dJ}{d\theta} = 0 \qquad \text{[Equation 4]}$$

Moreover, the range limiting the edge direction is not only within ±45 degrees, but may be appropriately set at a range suitable for an image, i.e., for example, within ±22.5 degrees.

Next, the roll correction amount is calculated. As the most simple manner, an amount obtained by sign-reversing the above-described roll amount θ may be used as the roll correction amount. However, to perform stable roll correction against a rapid scene change and a periodical intensity change such as a flicker, it is preferable to impose a limit to time change in the roll correction amount to be adapted. For example, the roll correction amount may be obtained using a roll amount at a current time and a roll amount at an earlier time.

Therefore, a roll correction amount candidate φ obtained by sign-reversing the roll amount θ may be calculated per field (16.7 msec), and then the roll correction amount may be calculated from a roll correction amount candidate φt calculated in a current field t and a roll correction amount Φt−1 calculated in the previous field t−1 in the manner expressed by Equation 5.

$$\Phi_t = \alpha \phi_t + (1-\alpha) \times \Phi_{t-1} \qquad \text{[Equation 5]}$$

where Φt is a roll correction amount applied to the current field t, Φt−1 is a roll correction amount applied to the previous field t−1 and α is a weight coefficient. It has been empirically confirmed by the present inventors that setting α at about 0.1-0.01 makes a change in the roll correction amount follow a rapid scene change with a one- or two-second delay.

Note that Equation 5 may be reduced to Equation 6 using an obtained roll correction amount candidate φt−1.

$$\Phi_t = \alpha \phi_{t-1} + (1-\alpha) \times \Phi_{t-1} \qquad \text{[Equation 6]}$$

By calculating the roll correction amount in this manner, it is possible to impose a limit to a time change in the roll correction amount to be adapted, so that stable roll correction can be performed against a rapid scene change and a periodic illumination change such as a flicker. Therefore, it is possible to prevent roll correction which makes a viewer feel uncomfortable.

Moreover, by not only searching the maximum value of the evaluation function J but also obtaining a two-dimensional frequency distribution of derivative values of intensity values in the x and y axis directions, and a frequency distribution of a ratio expressed by Equation 7, an angle θ which is expressed by Equation 8 and appears at the largest frequency can be detected as the roll amount.

$$\frac{\partial I}{\partial y} \Big/ \frac{\partial I}{\partial x} \qquad \text{[Equation 7]}$$

$$\theta = \tan^{-1}\left(\frac{\partial I}{\partial y} \Big/ \frac{\partial I}{\partial x}\right) \qquad \text{[Equation 8]}$$

Note that in this embodiment, the method for calculating a roll correction amount from a vertical edge element has been described. However, a roll correction amount can be obtained using a horizontal edge element, a directional filter and the like. For example, when a scene is limited, as in an image captured on the sea and the like, roll correction may be performed so that the horizon comes out horizontally.

Note that a roll amount between different frames may be detected. Frames to be compared may be consecutive frames or frames with a time difference corresponding to two or more frames. For example, a method for detecting the roll amount between frames by detecting an optical flow may be used. In such a case, however, it is necessary to examine a difference between the vertical direction in the actual world and the vertical direction in an image using some other method.

Note that with a gravity sensor installed in the image capturing system, the roll amount may be detected.

Figure 5:
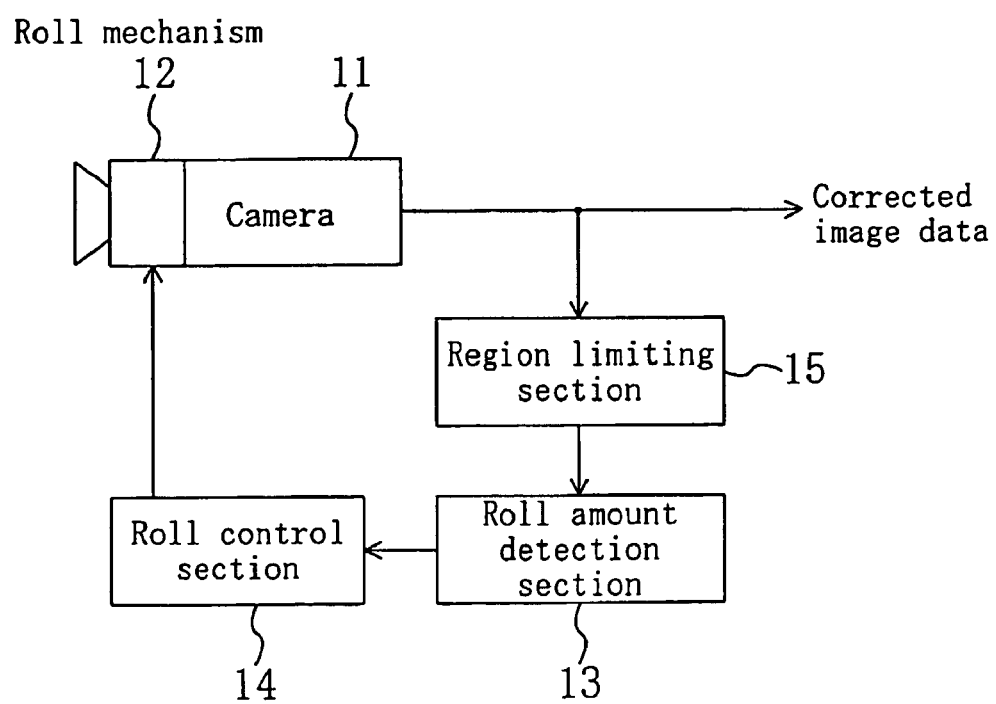
FIG. 5 is a block diagram illustrating the configuration of an image capturing system, in which region limitation is performed, according to the first embodiment of the present invention.

Moreover, as the configuration of FIG. 5, the region limiting section 15 for detecting a target region in which a vertical edge element is detected may be provided. Specifically, the region limiting section 15 limits image data of an image captured by the camera 11 to an upper region of the image and outputs the limited image data. Then, the roll amount detection section 13 as a correction amount calculation section detects a roll amount as feature data of the image from the limited image data output from the region limiting section 15 and calculates a correction amount from the roll amount. The roll control section 14 and the roll mechanism 12 together form a correction section. Thus, for example, a region can be limited by a feature of image data. Therefore, a horizontal edge element can be efficiently removed, thus resulting in improvement of accuracy in detecting the roll amount.

For example, when a background of image data is an indoor scenery, the lower region of the image data is considered to include the floor often and not to include many vertical edges. In this case, by inputting only the upper region in the image data to the roll amount detection section 13 by the region limiting section 15, horizontal edge elements can be efficiently removed, thus allowing improvement of accuracy in calculation of the roll correction amount. Furthermore, limitation of the target region for detection of a roll amount can be manually set by a user according to a situation.

In this case, as the most simple example, the upper region means to be approximately upper half of the image. Moreover, the upper region may be a rectangular or oval region included in the approximately upper half of the region. Alternatively, the upper region may be a region of which barycentric position is located higher than a threshold (e.g., a center position of the entire image) among regions obtained by dividing the image by a known segmentation method.

As has been described, according to this embodiment, an edge close to the vertical direction is extracted from image data and a roll of the camera 11 is controlled so that the extracted edge becomes vertical, thereby allowing correction of an inclination of the image with respect to the horizontal direction.

In a wearable image capturing system, especially, a system in which a camera is worn on the head of a person taking an image, an inclination of the head of the person as it is becomes an inclination of image data and the inclined image data is reproduced as it is. According to this embodiment, however, even when the head of a person taking an image is inclined, advantageous effects can be achieved, i.e., image data in which the inclination is corrected can be output.

Note that not only in a wearable system but also in a general image capturing system, when a scenery including a vertical edge of an artificial object such as the inside of a room and a building is taken as an image, roll correction can be performed to achieve great practical effects.

Moreover, if at least one of the roll amount and the roll correction amount is output, a system according to this embodiment can be used as a gyrosensor. Also, if a motion correction amount detected in a third embodiment later described is output with the roll amount and/or the roll correction amount, the system of this embodiment can be used as a gyrosensor for the roll axis, pitch axis and yawing axis.

Moreover, by accumulating the roll amount, the roll correction amount and the motion amount, how a camera has moved in the actual world can be analyzed. As another application, it is also possible to save a history of a movement of an image capturing camera in capturing a movie and the like and reproduce the camera movement.

Moreover, in using a camera accompanying an auto drive system or a camera movable on or in the water or in the air, a roll amount to be corrected seems to be larger, compared to image capturing by a human. In image capturing by such a camera, the roll correction function according to this embodiment is effective.

Note that by adding display means such as a display for displaying at least one of the roll amount and the roll correction amount to the configuration of FIG. 1 or FIG. 5, a user can perform directly roll correction of the optical system of the camera 11.

SECOND EMBODIMENT

In the first embodiment, roll correction of an image is realized by correction control of an optical system of a camera. In contrast, according to this embodiment, roll correction of an image is realized by correction of image data. Calculation of a roll correction amount is performed in the same manner as in the first embodiment and therefore the detail description will be omitted herein.

Figure 6:
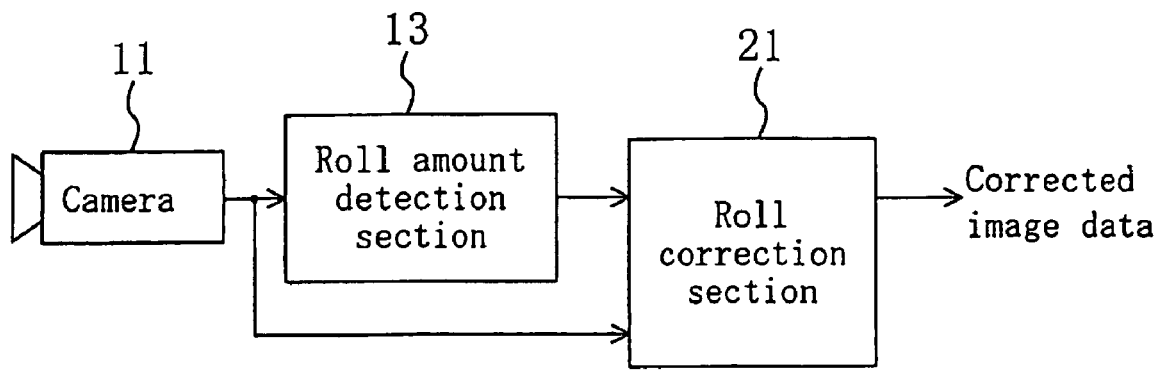
FIG. 6 is a block diagram illustrating the configuration of an image capturing system according to a second embodiment of the present invention.

FIG. 6 is a block diagram illustrating the configuration of an image capturing system according to this embodiment. In FIG. 6, each member also shown in FIG. 1 is identified by the same reference numeral. The roll correction section 21 performs roll correction of image data output from the camera 11 using a roll correction amount output from the roll amount detection section 13.

Figure 7:
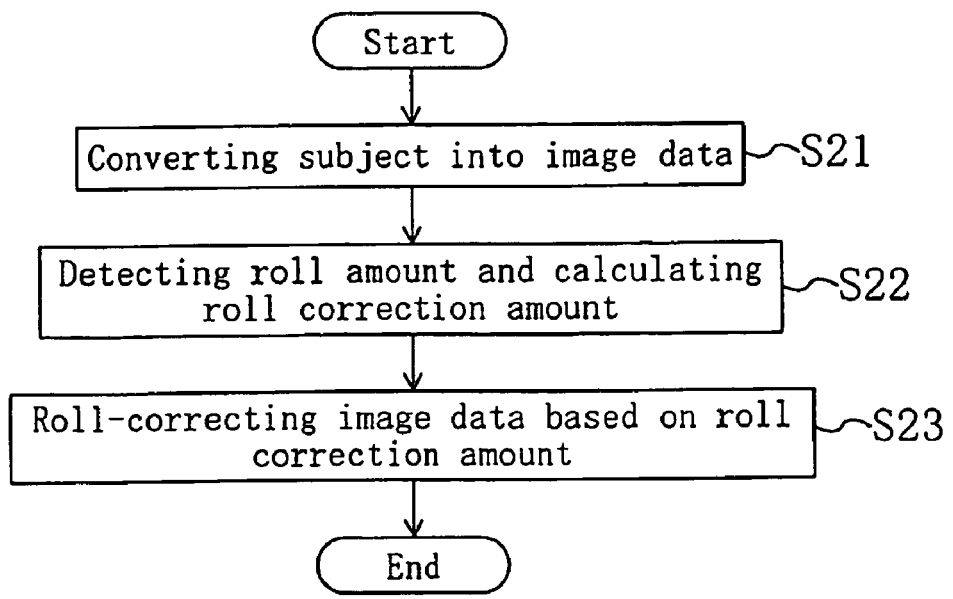
FIG. 7 is a flowchart illustrating the operation of the image capturing system of FIG. 6.

The operation of the configuration of FIG. 6 will be described with reference to a flowchart of FIG. 7.

First, the camera 11 converts an imaging subject into image data (S21). Next, the roll amount detection section 13 detects a roll amount of an image with respect to the horizontal direction and calculates a roll correction amount (S22). A calculation method in this embodiment is similar to that in the first embodiment and therefore description will be omitted.

Next, the roll correction section 21 performs roll correction of the image data output from the camera 11, based on the roll correction amount calculated by the roll amount detection section 13 and outputs an image of which an inclination is corrected (S23).

In this case, roll correction of the image data is performed in the following manner. As shown in Equation 9, the image data is multiplied by a roll matrix using the roll correction amount $\theta$ obtained in the same manner as in the first embodiment to rotate the image data.

$$\begin{pmatrix} x2 \\ y2 \end{pmatrix} = \begin{pmatrix} \cos\theta & \sin\theta \\ -\sin\theta & \cos\theta \end{pmatrix} \begin{pmatrix} x1 - cx \\ y1 - cy \end{pmatrix} + \begin{pmatrix} cx \\ cy \end{pmatrix}$$ [Equation 9]

wherein (x1, y1) indicates pixel coordinates of the original image data and (x2, y2) indicates pixel coordinates after roll correction. (cx, cy) indicates coordinates of the center of a roll and can be given by properly setting a center point such as the center of the image data suitable for the image as the center of a roll.

As has been described, according to this embodiment, roll correction is performed to image data, thus, not only the same effects as those of the first embodiment can be achieved but also correction of an inclination of an image captured by a camera having no roll mechanism can be performed.

Figure 8:
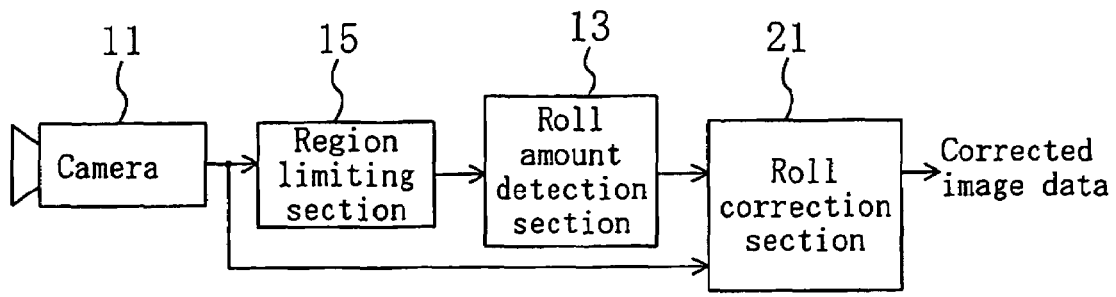
FIG. 8 is a block diagram illustrating the configuration of an image capturing system, in which region limitation is performed, according to the second embodiment of the present invention.

Moreover, as shown in FIG. 8, the region limiting section 15 described in the first embodiment may be provided in the subsequent stage of the camera 11. The roll correction section 21 forms a correction section. Thus, as in the first embodiment, a region in which feature data is detected can be limited according to a feature of image data, thus resulting in improvement of accuracy in detecting a roll amount.

Note that if display means such as a display for displaying at least one of a roll amount and a roll correction amount and a roll mechanism for rotating the optical system of the camera 11 are added to the configuration of FIG. 6 or FIG. 8, roll correction of the optical system of the camera 11 can be performed directly by a user.

THIRD EMBODIMENT

In this embodiment, the function of performing motion correction in the up, down, left or right directions by motion detection is added to the image roll correction function which has been described in the first and second embodiments.

Figure 9:
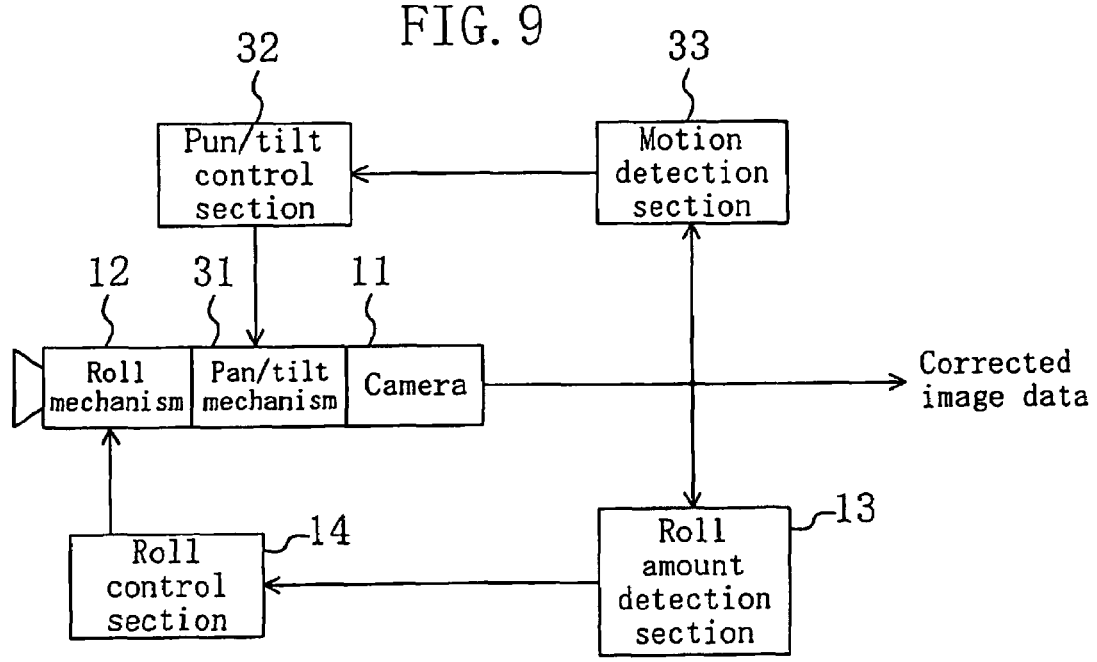
FIG. 9 is a block diagram illustrating the configuration of an image capturing system according to a third embodiment of the present invention.
Figure 10:
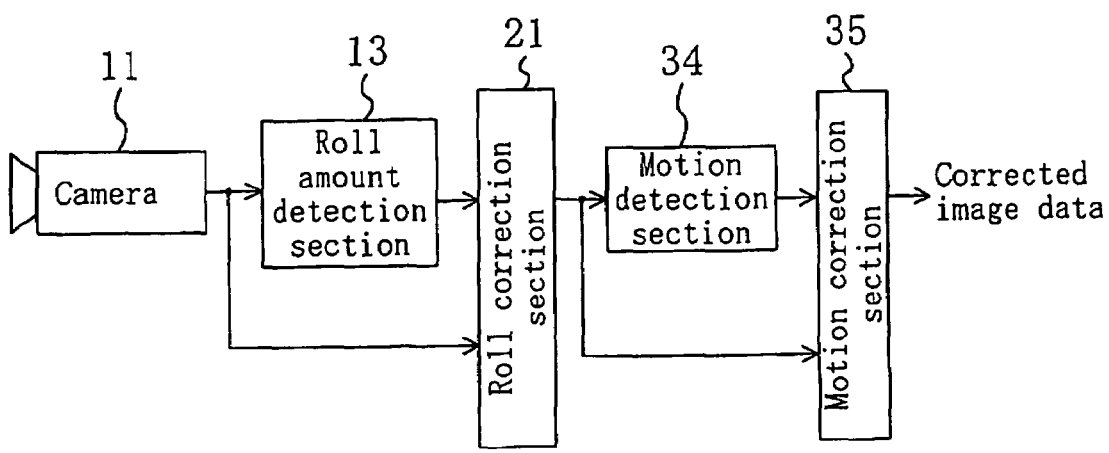
FIG. 10 is a block diagram illustrating the configuration of an image capturing system according to the third embodiment of the present invention.

FIGS. 9 and 10 are block diagrams illustrating the configuration of an image capturing system according to this embodiment. In FIG. 9, each member also shown in FIG. 1 is identified by the same reference numeral. In FIG. 10, each member also shown in FIG. 6 is identified by the same reference numeral.

First, in FIG. 9, a pan/tilt mechanism 31 pans (in the right or left direction) and tilts (in the up or down direction) the optical system of the camera 11. A motion detection section 33 detects a motion vector from image data output from the camera 11. A pan/tilt control section 32 controls the pan/tilt mechanism 31, based on the motion vector detected by the motion detection section 33. Note that correction control by the roll mechanism 12 is performed in the same manner as in the first embodiment.

The motion detection section 33 receives the image data output from the camera 11 and detects a motion vector in the up-down or left-right direction. In this case, the motion vector can be obtained from the image correspondence relation between fields. Next, the pan/tilt control section 32 detects a shake of the camera 11 from the motion vector detected by the motion detection section 33 and calculates a pan/tilt correction amount by which the optical system of the camera 11 is panned or tilted. Then, the pan/tilt mechanism 31 pans or tilts the optical system of the camera 11, based on the pan/tilt correction amount.

Moreover, in FIG. 10, the motion detection section 34 detects a motion vector in the up-down or left-right direction from image data roll-corrected and output from the roll correction section 21. The motion correction section 35 corrects a movement of the image data in the up-down or left-right direction, based on the motion vector output from the motion detection section 34. Note that correction of the image data by the roll correction section 21 is performed in the same manner as in the second embodiment.

The motion detection section 34 detects a motion vector in the up-down or left-right direction from image data output from the roll correction section 21. In this case, for example, as in the known techniques, the motion vector can be obtained from the image correspondence relation between fields. Next, the motion correction section 35 detects a shake of the image data from the received motion vector, calculates a pan/tilt correction amount by which the image data is panned or tilted, and corrects the image data, based on the pan/tilt correction amount.

As has been described, according to this embodiment, it is possible to correct not only an inclination of an image but also a shake in the up-down or left-right direction.

Note that the motion detection section 34 and the motion correction section 35 of FIG. 10 may be provided in the subsequent stage of the configuration of FIG. 1 of the first embodiment to correct a shake of the image data in the up-down or left-right direction.

Note that by adding display means such as a display for displaying at least one of a roll amount and a roll correction amount and a roll mechanism for rotating the optical system of the camera 11 to the configuration of FIG. 9 or FIG. 10, roll correction of the optical system of the camera 11 can be performed directly by a user.

Modified Example of Third Embodiment

The configurations of FIGS. 9 and 10 are for detecting a roll amount and a motion vector from an image and correcting a roll and a shake of the optical system of the camera 11. As a modified example of the configurations, it is feasible to achieve a configuration in which a motion amount and a roll amount are from a captured image and, instead of performing correction on real time, correction is performed when the image is being stored.

Figure 11:
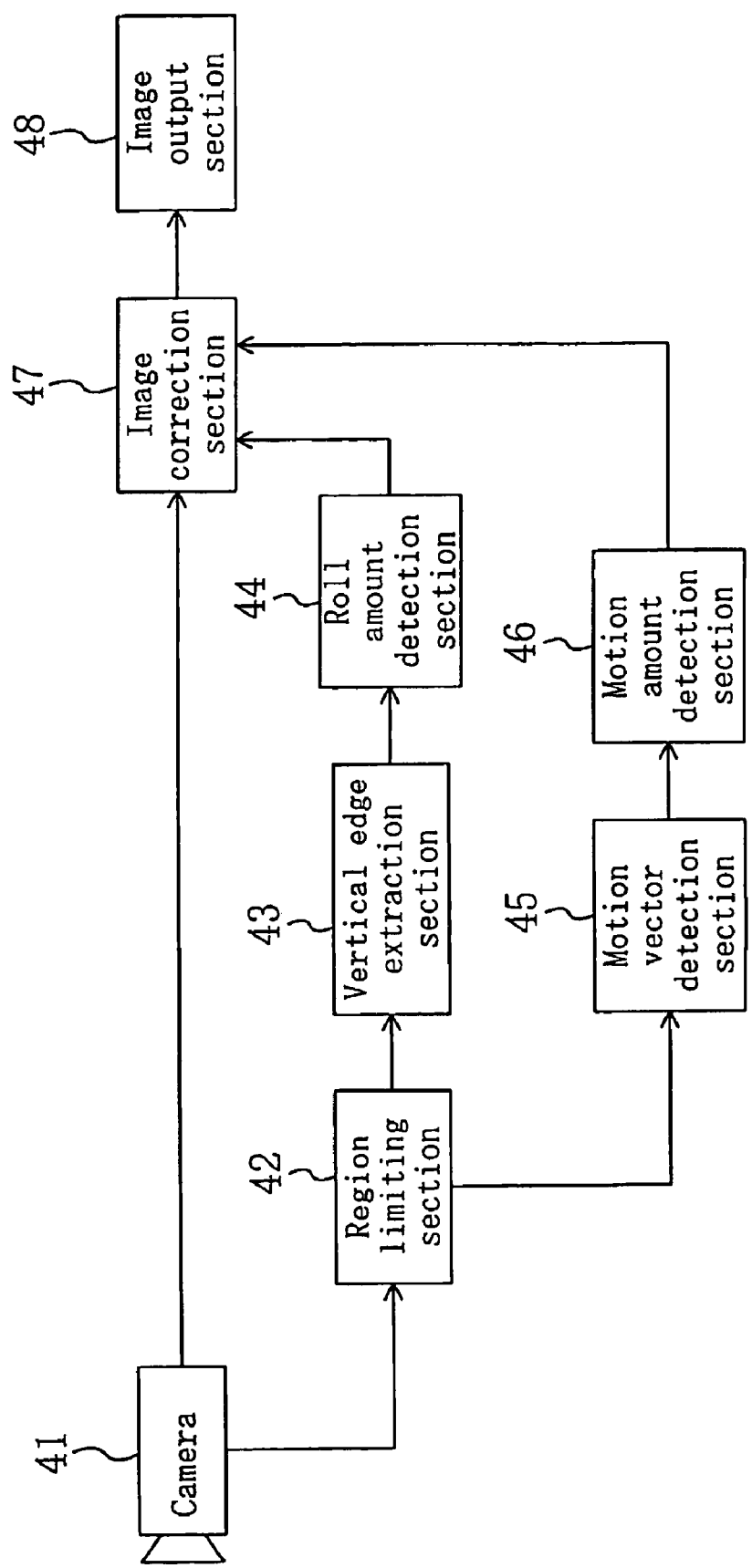
FIG. 11 is a block diagram illustrating an exemplary configuration according to a modified example of the third embodiment of the present invention.

FIG. 11 is a block diagram illustrating an exemplary configuration according to the above-described modified embodiment. In FIG. 11, the reference numeral 41 denotes a camera for capturing a motion picture, the reference numeral 42 denotes a region limiting section for extracting image data in a predetermined region of an image captured by the camera 41, the reference numeral 43 denotes a vertical edge extraction section for extracting a vertical edge from the image extracted by the region liming section 42, the reference numeral 44 denotes a roll amount detection section for detecting a roll amount of the camera 41 from the vertical edge extracted by the vertical edge extraction section 43, the reference numeral 45 denotes a motion vector detection section for detecting a motion vector from the image extracted by the region limiting section 42, the reference numeral 46 denotes a motion amount detection section for detecting a motion amount of the camera 41 from the motion vector detected by the motion vector detection section 45, the reference numeral 47 denotes a captured-image correction section for correcting a captured image from the motion amount detected by the roll amount detected by the roll amount detection section 44 and the motion vector detection section 45, and the reference numeral 48 denotes an image output section for outputting the image corrected by the captured-image correction section 47. Note that the configuration of FIG. 11 and its operation are the same as those of the embodiments and therefore the detail description will be omitted.

Figure 12:
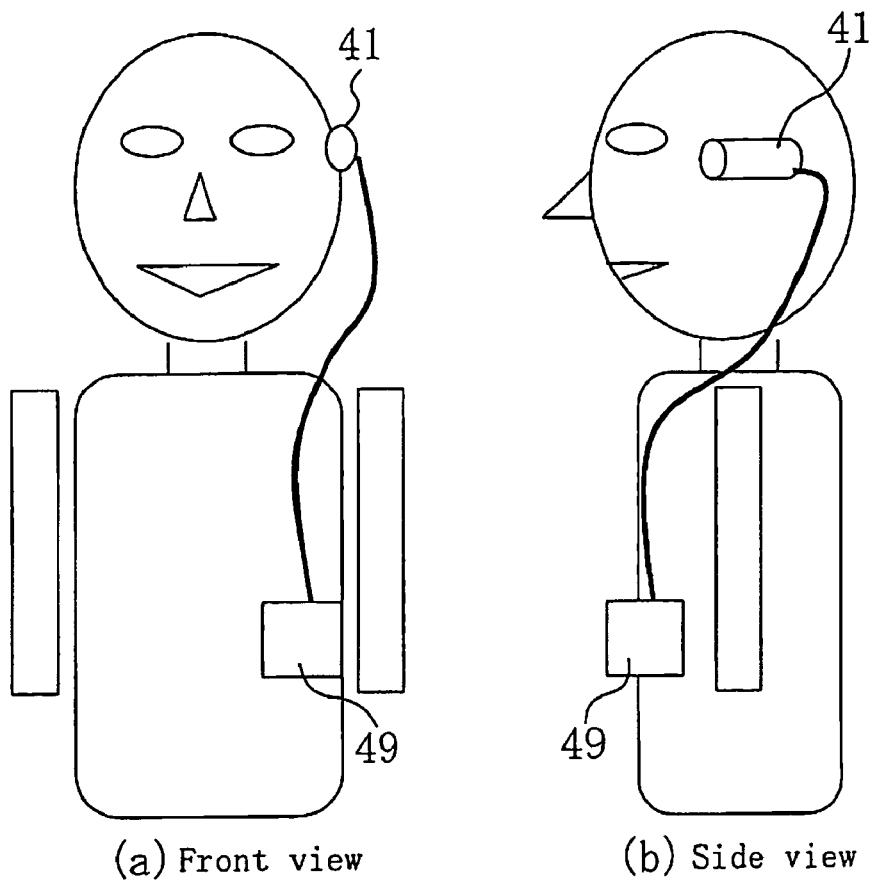
FIG. 12 is an illustration of an exemplary application form of the modified example of the third embodiment of the present invention.

FIG. 12 is an illustration of an exemplary application form of this modified example. In FIG. 12, a user wears the camera 41 on the head and image data captured by the camera 41 is stored in a hard disk recorder 49. Then, elements 42 through 48 in the configuration of FIG. 11 are achieved by, for example, a CPU, a memory and the like in the hard disk recorder 49. A roll amount and a motion amount are detected and correction of an image is performed when the image data is being stored.

As shown in FIG. 12, when the camera 41 is worn on the head, detection of a roll amount is particularly important because of a movement and an inclination of the head. Therefore, by performing correction of the roll amount, an easily-browsable motion picture can be stored.

FOURTH EMBODIMENT

Figure 13:
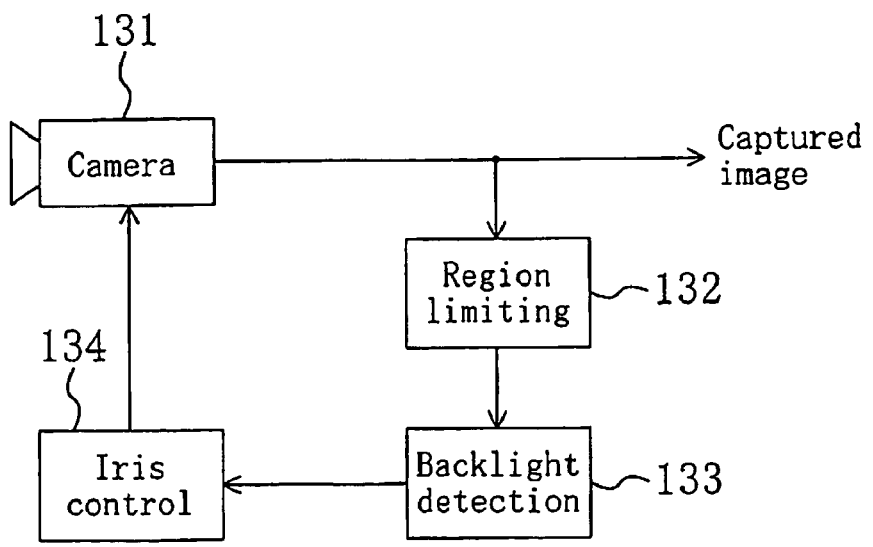
FIG. 13 is a block diagram illustrating the configuration of an image capturing system according to a fourth embodiment of the present invention.

FIG. 13 is a block diagram illustrating the configuration of an image capturing system according to a fourth embodiment. In FIG. 13, the reference numeral 131 denotes a camera, the reference numeral denotes a region limiting section, the reference numeral 133 denotes a backlight detection section as a correction amount calculation section, and the reference numeral 134 denotes an iris control section. The iris control section 134 and an iris (not shown) in the camera 131 together form a correction section. The region limiting section 132 limits a region in which backlight detection for an image captured by the camera 131 is performed. In a general image capturing performed outside, illumination such as sunlight comes from above a field of view of a camera. Therefore, a processing region is limited to an upper region of an image by the region limiting section 132.

In this case, it is preferable that the upper portion of an image is set according to any one or a combination of the following conditions:

a rectangular or oval region including part of approximately upper half region of an image a region of which barycentric position is located higher than a threshold (e.g., a center position of the entire image) among regions obtained by dividing the image by a known segmentation method a portion of the upper region in which an intensity value is a predetermined threshold or more a portion of the region in which an intensity value is a predetermined threshold or more of which barycentric position is located higher than a threshold (e.g., a center position of the entire image)

Figure 14:
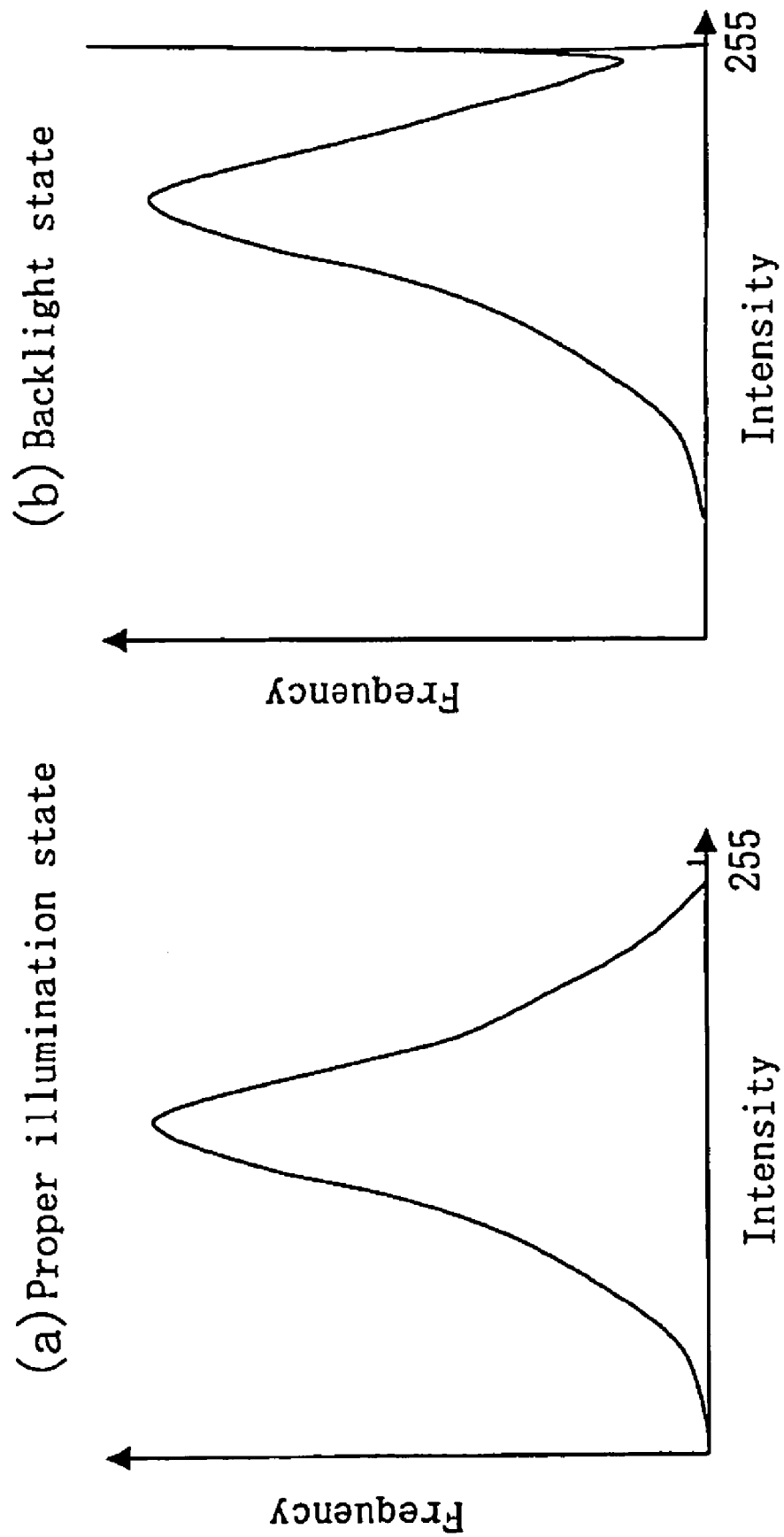
FIG. 14 shows graphs schematically illustrating illumination frequency distributions in a proper illumination state and in a backlight state, respectively.

The backlight detection section 133 obtains an intensity in a region limited by the region limiting section 132 and detects an exposure state of the image as feature data from the frequency distribution of the intensity. Then, whether or not the image is in a backlight state is judged, and if it is judged that the image is in a backlight state, an exposure correction amount is calculated. FIG. 14 shows graphs schematically illustrating illumination frequency distributions in a proper illumination state and in a backlight state, respectively. For example, in eight bit quantization, whether or not an image is in a backlight state is judged from whether or not a value for a maximum intensity of an input image is 255 or whether the frequency of the intensity of 255 is a threshold or more or the like.

When a backlight state is detected by the backlight detection section 133, the iris control section 134 controls the iris of the camera 131 according to a given exposure correction amount to reduce the amount of incident light.

Moreover, an attitude of the camera 131 may be detected and the range of the upper region may be adjusted according to the detected camera attitude. For example, when an optical axis of the camera 131 is approximately horizontal, the processing region may be limited to the upper region, and when the optical axis of the camera 131 is directed upward, a high intensity region in the image may be the processing region. Moreover, the attitude of the camera 131 can be detected, for example, by means such as a gyrosensor.

Figure 15:
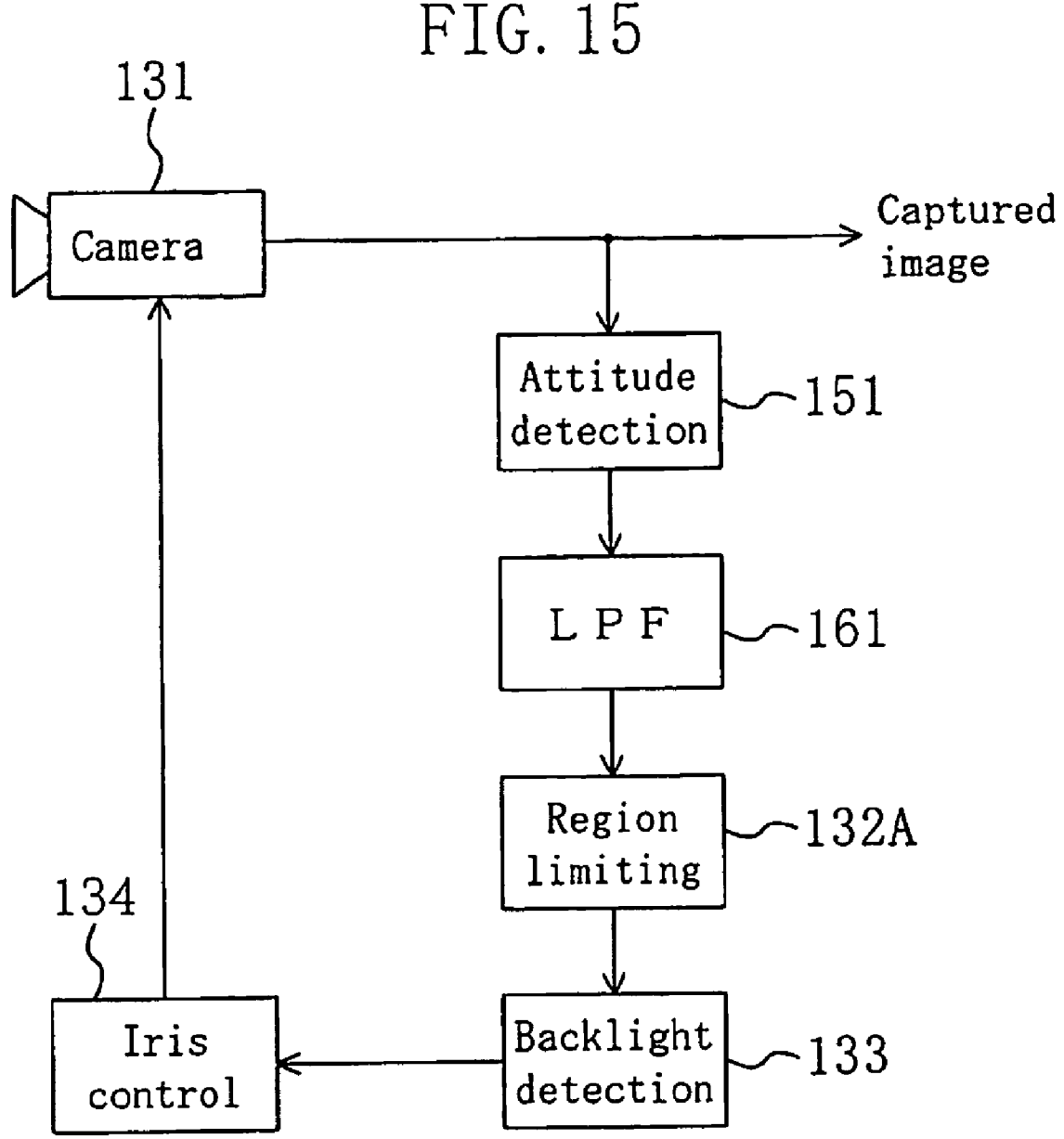
FIG. 15 is a block diagram illustrating another exemplary configuration of the image capturing system according to the fourth embodiment of the present invention.

FIG. 15 is a block diagram illustrating the configuration of an image capturing system which can realize the above-described operation. Each member also shown in FIG. 13 is identified by the same reference numeral and therefore the detail description will be omitted herein.

An attitude detection section 151 includes, for example, an acceleration sensor such as a gyro, and detects the attitude of the camera 131. An LPF section 161 smoothes information for the attitude of the camera, detected by the attitude detection section 151 in the time direction. A region limiting section 132A adjusts a limited region in the image according to an attitude detection result by the attitude detection section 151.

Note that with the LPF section 161 provided, it is possible to prevent an abrupt change in a final processing result for the image in the time direction in the case where the attitude of the camera 131 is rapidly changed or repeatedly changed with short intervals. Specifically, as the attitude of the camera 131 is rapidly changed or repeatedly changed with short intervals, a region limited by the region limiting section 132A is drastically changed. As a result, the final processing result for the image is drastically changed in the time direction, so that discomfort and unpleasant feelings might be given to a viewer. To avoid this, a limitation can be imposed to a change in the information for the detected attitude of the camera in the time direction. Note that the LPF section 161 may be omitted.

As has been described, according to this embodiment, by limiting a target region in which backlight detection is performed is limited to the upper region of an image, stable backlight correction can be preformed.

Note that in this embodiment, as exposure correction, backlight correction is performed. However, exposure correction is not limited to backlight correction. In some other exposure correction such as excessive forward light correction, when an image is captured under the illumination from above, in general, stable correction can be performed by limiting a detection target region to an upper region of the image.

Moreover, instead of correction control of an optical system of a camera, correction such as intensity correction may be performed to obtained image data.

Moreover, in the case of the above-described roll correction, the attitude of an camera may be detected and the range of an upper region may be adjusted according to the detected attitude of the camera.

FIFTH EMBODIMENT

Figure 16:
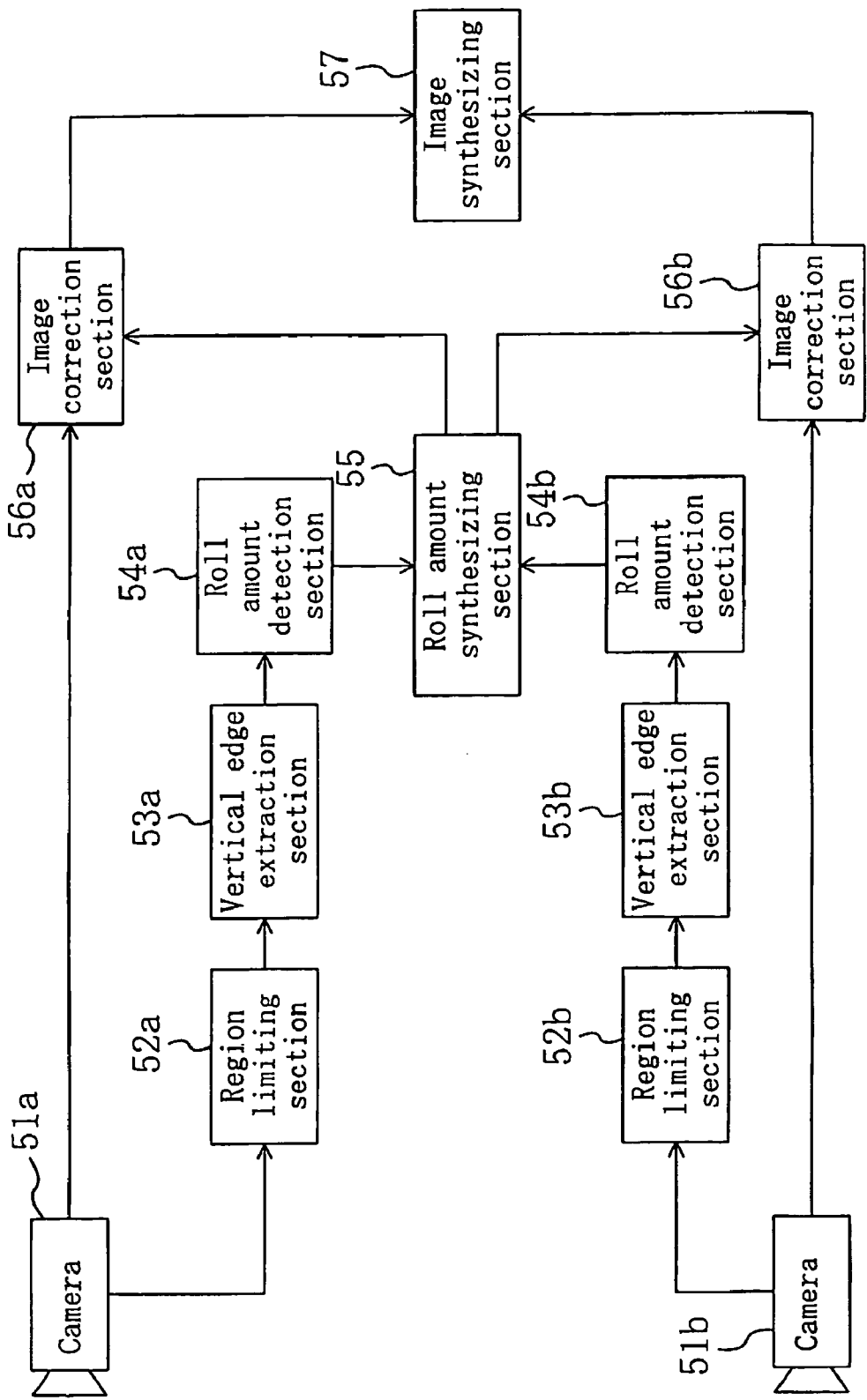
FIG. 16 is a block diagram illustrating an exemplary configuration of an image capturing system according to a fifth embodiment of the present invention.

FIG. 16 is a block diagram illustrating an exemplary configuration of an image capturing system according to a fifth embodiment of the present invention, in which an image is obtained by a plurality of imaging means. In FIG. 16, the reference numerals 51a and 51b denote first and second cameras for capturing a motion picture, the reference numerals 52a and 52b denote first and second region limiting sections for extracting image information in a predetermined region of an image captured by the first camera 51a or the second camera 51b, the reference numerals 53a and 53b denote first and second vertical edge extraction sections for extracting a vertical edge from the image extracted from the first region limiting section 52a or the second limiting section 52b, the reference numerals 54a and 54b denote first and second roll amount detection sections for detecting a roll amount of the first camera 51a or the second camera 51b from the vertical edge extracted by the first vertical edge extraction section 53a or the second vertical edge extraction section 53b, the reference numeral 55 denotes a roll amount synthesizing section for synthesizing roll amounts detected by the first and second roll amount detection sections 54a and 54b, the reference numerals 56a and 56b denote first and second captured-image correction sections for calculating a roll amount of the first and second cameras 51a or 51b from a roll amount synthesized by the roll amount synthesizing section 55 and correcting each captured image, and the reference numeral 57 denotes an image synthesizing section for synthesizing images corrected by the first and second captured-image correction sections 56a and 56b.

FIG. 17 is an illustration of an exemplary application form of this embodiment. As shown in FIGS. 17(a) and 17(b), a user wears a first camera 51a (camera 1) and a second camera 51b (camera 2) on the left and right of the head, respectively, and image data captured by the cameras 1 and 2 is stored in a hard disk recorder 59. Then, when the image data is stored, a roll amount is detected, for example, by a CPU, a memory and the like in the hard disk recorder 59 and correction of an image is performed.

As shown in FIG. 17(c), the user can take an image of the front of the user using the cameras 1 and 2 which the user wears on the left and the right of the head. Respective viewing angles of the cameras 1 and 2 overlap each other, and thus captured images have common part. Each of the cameras 1 and 2 is worn on the head and therefore physical roll amounts of the cameras are substantially the same. However, what comes out in each of the captured images is different, so that the respective roll correction amounts of the cameras might be different. Then, in this embodiment, a roll angle of the head is detected from the respective roll correction amounts of the images obtained from the cameras 1 and 2 and correction of each of the images is performed using the detected roll angle of the head.

Figure 18:
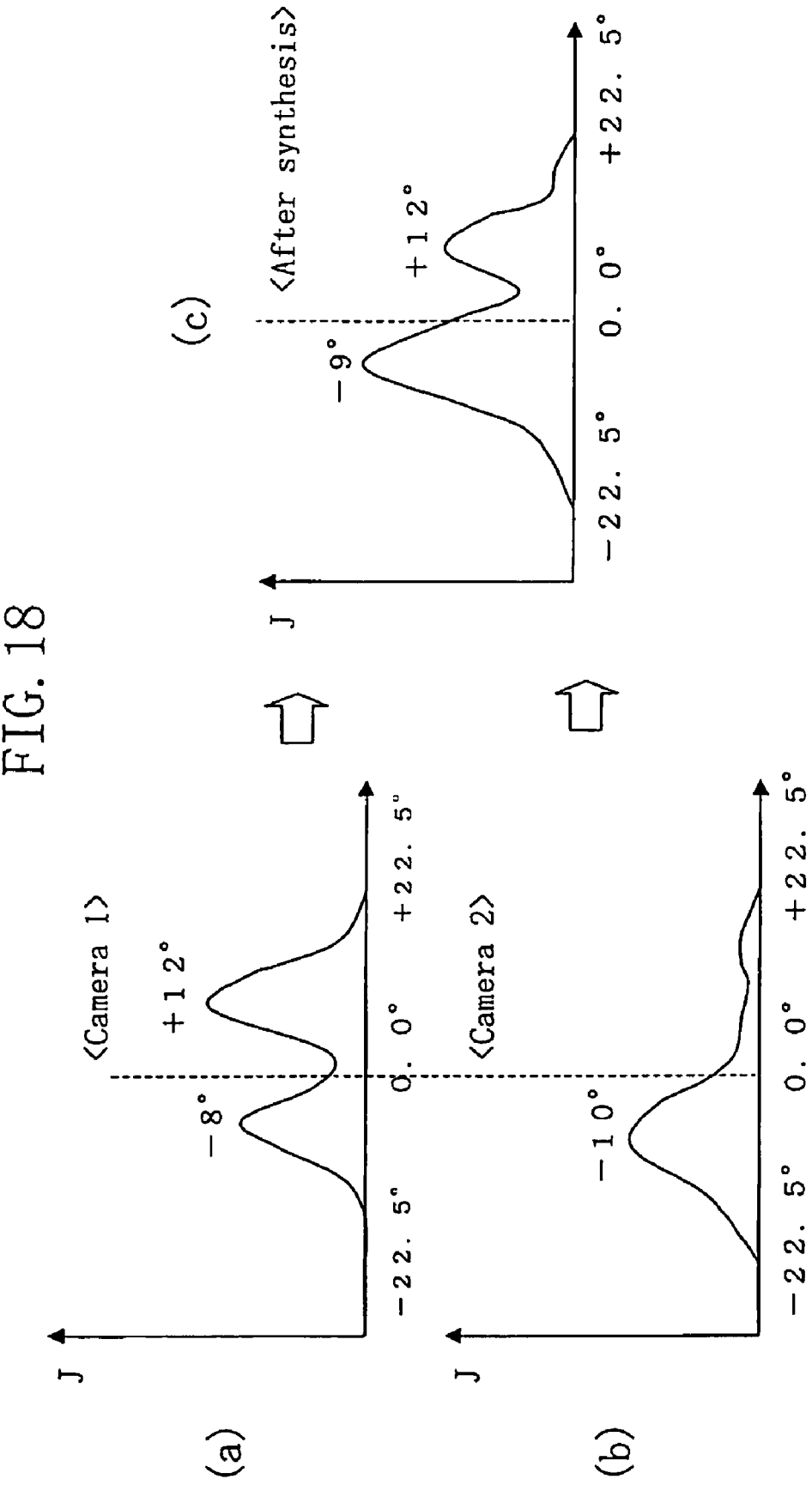
FIG. 18 shows graphs conceptually illustrating synthesis of roll correction amounts according to the fifth embodiment of the present invention.

FIG. 18 shows graphs conceptually illustrating synthesis of roll correction amount according to this embodiment. Each of the graphs of FIG. 18 shows a distribution of the evaluation function J. FIG. 18(a) shows the distribution thereof for an image of the camera 1, FIG. 18(b) shows the distribution thereof for an image of the camera 2, and FIG. 18(c) shows the distribution for after synthesis.

As shown in FIG. 18(a), in the image of the camera 1, an angle at which the evaluation function J is a maximal is "−8 degrees" and "+12 degrees". On the other hand, in FIG. 18(b), an angle at which the evaluation function J is a maximal is "−10 degrees". In this case, for example, if a roll angle for correcting the image is determined only using the image of the camera 1, the roll angle is "+12 degrees". In contrast, according to this embodiment, a roll angle of an image is detected using both images of the camera 1 and the camera 2. Thus, as shown in FIG. 18(c), the roll angle is determined to be "−9 degrees".

Accordingly, each of the images captured by the cameras 1 and 2, respectively, is corrected with a roll angle of "−9 degrees". That is, for cameras worn at the same part, respective roll correction amounts of the cameras are synthesized, so that each of the images can be corrected at a proper correction amount.

Then, by correcting the images of the cameras 1 and 2 using a proper correction amount, the images can be synthesized in the manner as shown in FIG. 19. That is, a roll-corrected, wide-angle image can be obtained. Note that in this case, image synthesis is performed to, for example, a region in which parts of two images overlap each other, so that a difference between respective pixel values of the images becomes small.

Note that in this embodiment, description has been made using as an example the case where the roll correction amounts of images are synthesized. In the same manner, by detecting motion vectors and synthesizing motion amounts, a proper correction amount for panning/tilting can be also obtained.

Note that in this embodiment, description has been made using as an example the case where a plurality of cameras are worn at the left and the right of the head, respectively. However, the present invention is not limited thereto. For example, if a plurality of cameras are worn on the chest or some other part of the human body and relative positions of the cameras are fixed, the present invention effectively functions.

Moreover, in this embodiment, a region in which a vertical edge is extracted is limited to the region limiting sections 52a and 52b. However, such a region limiting section is not necessary and a vertical edge may be extracted from the entire region of an image.

SIXTH EMBODIMENT

In the fifth embodiment, a more proper roll correction amount is obtained from a roll correction amount obtained from each camera image. Then, after correction has been performed using the roll correction amount, image synthesis is performed. However, depending on locations on which the cameras are worn, there might be cases where images of the cameras should not be synthesized. In this embodiment, whether or not images captured by the plurality of cameras should be synthesized is judged based on a roll correction amount.

Figure 20:
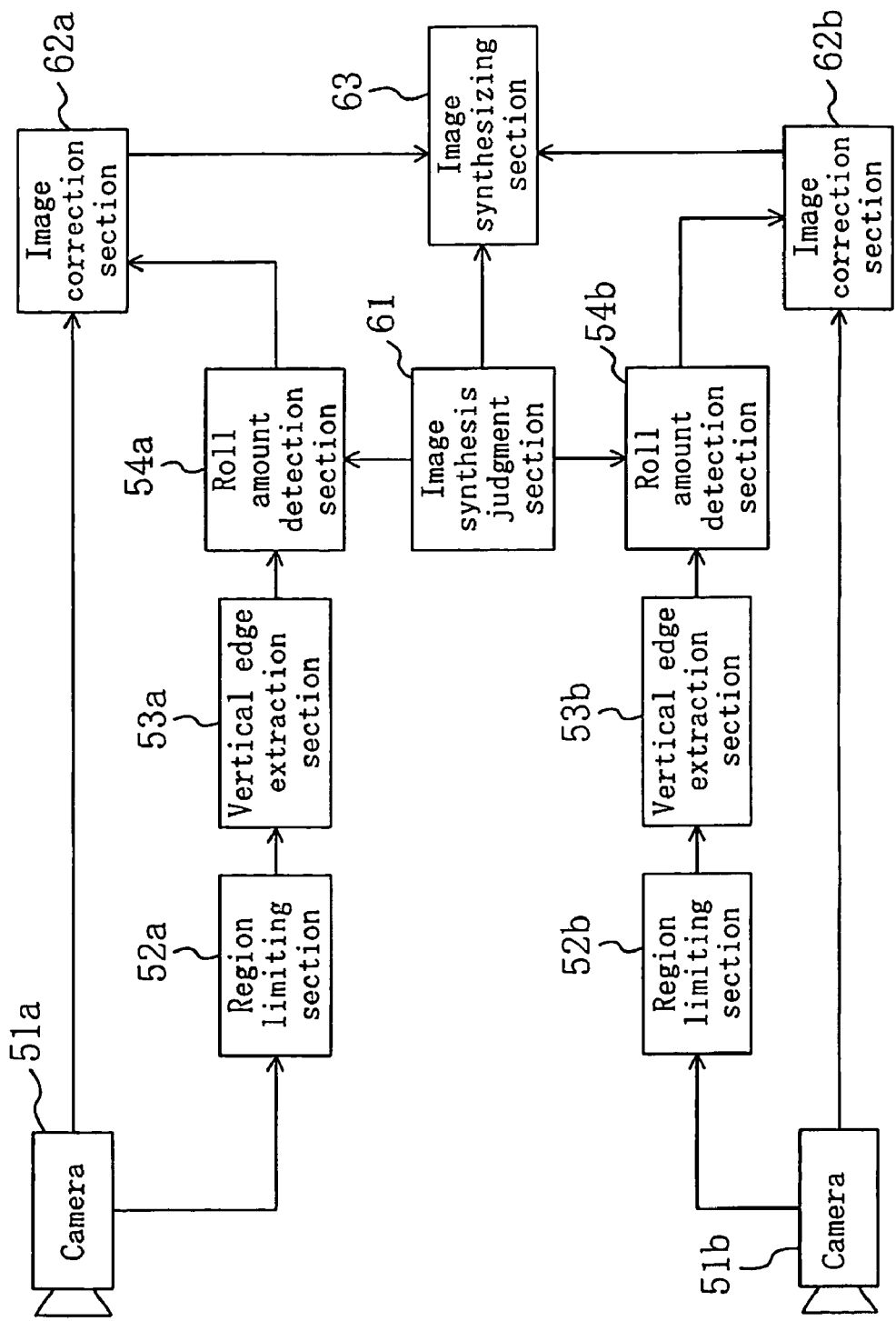
FIG. 20 is a block diagram illustrating an exemplary configuration of an image capturing system according to a sixth embodiment of the present invention.

FIG. 20 is a block diagram illustrating an exemplary configuration of an image capturing system according to this embodiment. In FIG. 20, each member also shown in FIG. 16 is identified by the same reference numeral. The reference numeral 61 denotes an image synthesis judging section for judging whether or not images should be synthesized from roll amounts detected by the roll amount detection sections 54a and 54b, the reference numerals 62a and 62b denote first and second captured-image correction sections for roll-correcting images captured by the first and second cameras 51a and 51b using the roll amounts detected by the roll amount detection sections 54a and 54b, and the reference numeral 63 denotes an image synthesizing section for synthesizing the corrected images by the first and second captured-image correction sections 62a and 62b, respectively, based on a judgment made by the image synthesis judging section 61.

Figure 21:
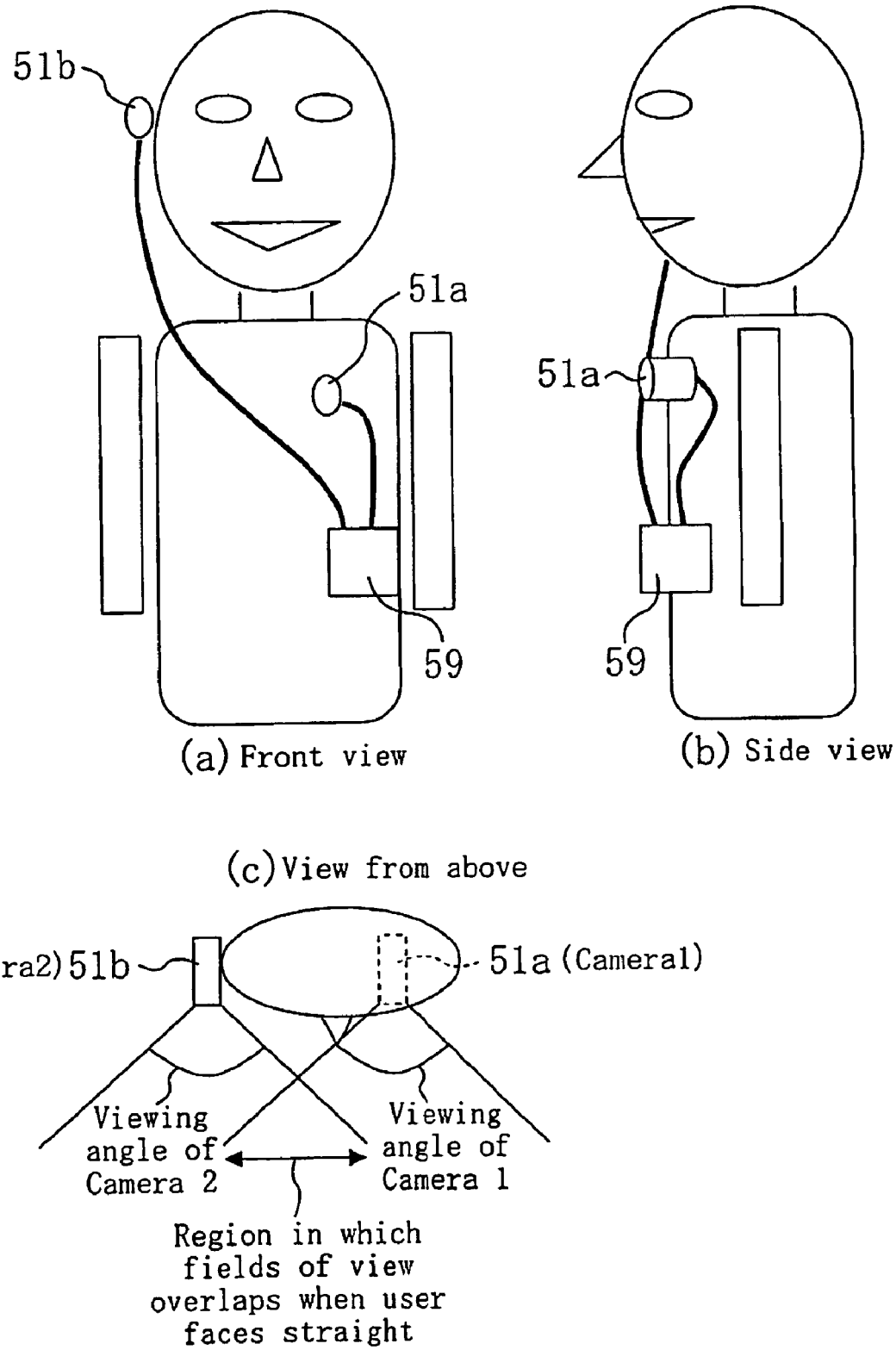
FIG. 21 is an illustration of an exemplary application form of the sixth embodiment of the present invention.

FIG. 21 is an illustration of an exemplary application form of this embodiment. As shown in FIGS. 21(a) and 21(b), a user wears a first camera 51a (camera 1) on the chest and a second camera 51b (camera 2) on the head. Image data for the front of the cameras captured by the cameras 1 and 2 is stored in the hard disk recorder 59. Then, when the image data is stored, for example, a roll amount is detected by a CPU, a memory and the like in the hard disk recorder 59 and correction of an image is performed while whether or not image synthesis should be performed is judged.

In the form of FIG. 17, since both of the cameras 1 and 2 are worn on the head, the correction amounts of the images are assumed to be substantially the same. Then, by synthesizing the corrected images, a wide-angle image can be obtained. However, as shown in FIG. 21, in the case where the camera 1 and the camera 2 are worn on different parts, i.e., on the chest and on the head, respectively, for example, if only the head turns to the left, the direction in which the camera 1 faces is different from the direction in which the camera 2 faces. In such a case, it is not appropriate to perform image synthesis.

Then, in this embodiment, whether or not image synthesis should be performed is judged from respective roll correction amounts of the cameras. FIG. 22 shows graphs conceptually illustrating judgment of whether or not image synthesis can be performed according to this embodiment. Each graph of FIG. 22 shows a distribution of the above-described evaluation function J. In FIG. 22(a), the angle for roll correction of the camera 1 is "–8 degrees" and the angle for roll correction of the camera 2 is "–10 degrees". That is, the angles of the cameras 1 and 2 take relatively close values. In this case, it is judged that the cameras 1 and 2 face to the same direction and then image synthesis is performed. On the other hand, in FIG. 22(b), the angle for roll correction of the camera 1 is "+11 degrees" and the angle for roll correction of the camera 2 is "–12 degrees". That is, the angles of the cameras 1 and 2 take largely different values. In this case, it is judged that the cameras 1 and 2 face in the different directions, respectively, and thus image synthesis is not performed. To judge which the cameras 1 and 2 face in the same direction or the different directions, for example, a difference between roll correction angles can be compared to an appropriate threshold.

As has been described, whether or not images captured by a plurality of cameras should be synthesized is judged based on roll correction angles and, as shown in FIG. 23, if the cameras face in the different directions, image synthesis is not performed (FIG. 23(a)) and if the cameras face in the same direction, image synthesis is performed. Thus, a more wide-angle image can be obtained.

Note that in this embodiment, whether or not image synthesis should be performed is judged using a difference between roll correction angles. However, instead of this, a judgment can be made using, for example, a motion vector. Specifically, a judgment may be made so that a motion vector is detected from each camera image, and if a difference in the motion vector between images is large, synthesis is not performed while if the difference in the motion vector between images is small, image synthesis is performed. Moreover, it is also possible to judge whether or not image synthesis should be performed using an intensity or a forward light level. Furthermore, whether or not image synthesis should be performed may be judged using respective features of images.

Moreover, in this embodiment, an example where two cameras are used has been described. However, as shown in FIG. 24, three or more cameras may be used. In the form of FIG. 24, a user wears a camera 1 on the head and cameras 2 and 3 on the left and the right of the head. Moreover, all of cameras are not necessarily worn the human body. For example, even if a combination of a small movie and a camera worn on the human body is used, this embodiment is applicable.

Moreover, in this embodiment, it is not always required to limit a region in which a vertical edge is extracted. A vertical edge may be extracted from the entire region of an image.

SEVENTH EMBODIMENT

In the fifth embodiment, a roll correction amount is detected for each camera and then detected roll correction amounts are synthesized, thereby obtaining a more proper correction amount. In contrast, in a configuration employing a plurality of cameras, it is also possible to use a roll correction amount obtained from an image captured by a camera for roll correction of some other camera.

Figure 25:
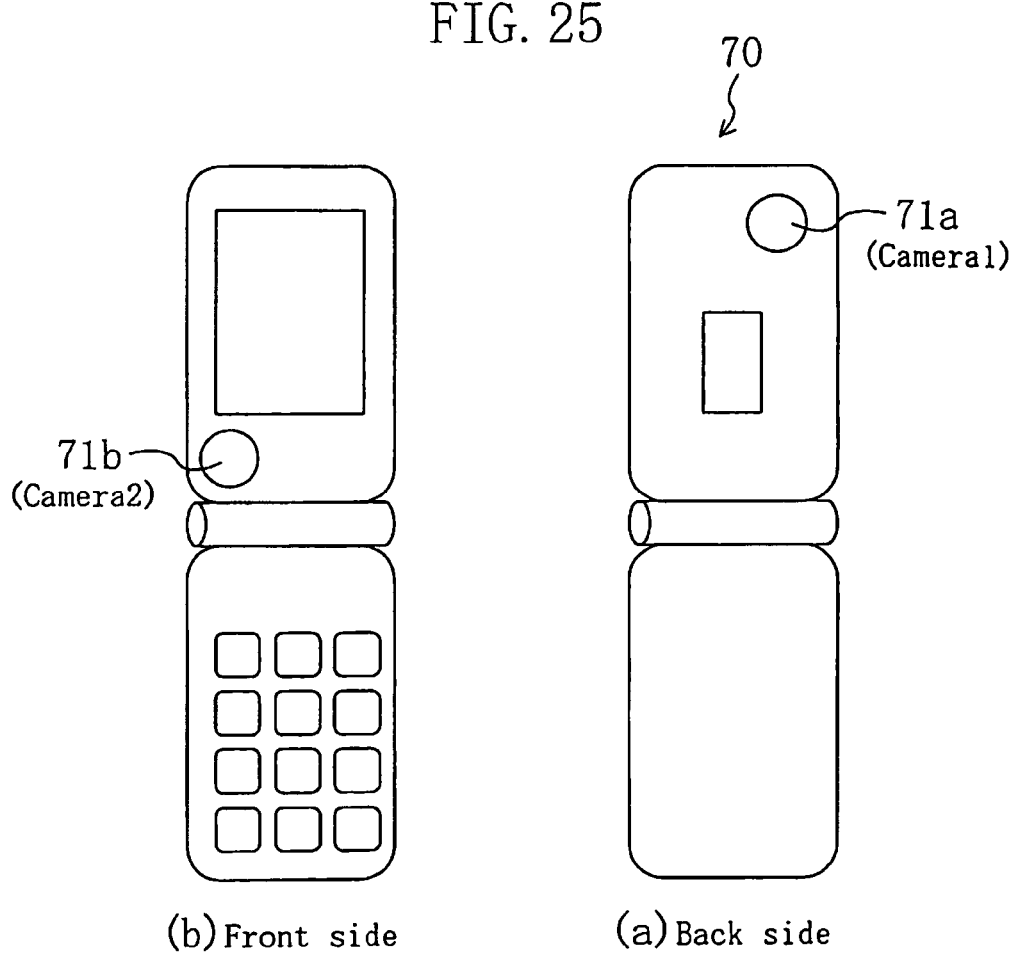
FIG. 25 is an external view of a cellular phone with cameras equipped to its both sides, respectively.

Specifically, in recent years, a cellular phone 70 shown in FIG. 25 and having a camera 71a (camera 1) and a camera 71b (camera 2) equipped to its both sides, respectively, has been put to practical use. As for such systems, in many cases, while one of the cameras, i.e., the camera 71b images the face of a user himself/herself at a short-distance, the other of the cameras, i.e., the camera 71a images an artificial object located at a long distance on the other side. In this case if a roll correction amount detected from an image captured by the camera 71*a* for performing long-distance imaging is used for roll correction of the camera 71*b* for performing short-distance imaging, roll correction can be performed more properly to an image captured by the camera 71*b*.

Figure 26:
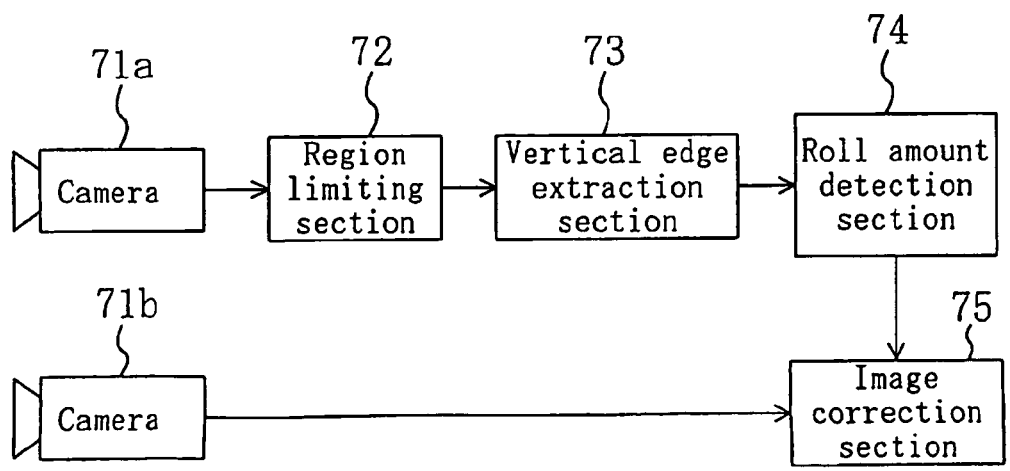
FIG. 26 is a block diagram illustrating an exemplary configuration of an image capturing system according to a seventh embodiment of the present invention.

FIG. 26 is a block diagram illustrating an exemplary configuration of an image capturing system according to this embodiment. In FIG. 26, the reference numerals 71*a* and 71*b* denote first and second cameras for capturing a motion picture, the reference numeral 72 denotes a region limiting section for extracting image information in a predetermined region of an image captured by the camera 71*a*, the reference numeral 73 denotes a vertical edge extraction section for extracting a vertical edge from the image extracted by the region limiting section 72, the reference numeral 74 denotes a roll amount detection section for detecting a roll amount of the first camera 71*a* from the vertical edge extracted by the vertical edge extraction section 73, and the reference numeral 75 denotes a captured-image correction section for correcting an image captured by the second camera 71*b* using a roll amount detected by the roll amount detection section 74.

In the cellular phone 70 of FIG. 25, the relative positions of the first and second cameras 71*a* and 71*b* are fixed. Thus, when an image captured by the camera 71*b* located on the front surface is inclined, an image captured by the camera 71*a* located on the back surface is also inclined. Moreover, when camera shake is caused in one of the cameras, camera shake of the other camera is also caused.

Accordingly, as shown in FIG. 27, roll correction of an image of a face, captured by the camera 2 located on the front side is performed (FIGS. 27(*b*) and 27(*c*)) using the roll correction amount of the image (FIG. 27(*a*)) captured by the camera 1 located on the back side. Specifically, the image captured by the camera 2 is an image in which an object at a short distance is imaged and an artificial object at a long distance is not imaged. Thus, there might be cases where roll correction is not properly performed. However, by making use of a roll correction angle detected from an image captured by the other camera for performing long-distance imaging, roll correction can be performed more properly.

Note that each means of the image capturing system of each of the embodiments or all or part of process steps of the imaging method of each of the embodiments may be achieved by using hardware for exclusive use, or may be achieved as software by a computer program. Moreover, assume that all or part of the process steps are achieved by a program. If the program is recorded on a recording medium such as a flexible disk, an optical disk, an IC card and a ROM cassette and is made removable, the all or part of the process steps can be performed in some other independent computer system in a simple manner.

INDUSTRIAL APPLICABILITY

The present invention allows correction of an image captured by a camera in a more proper manner than in a known technique. Accordingly, a clearer image can be obtained in a normal image capturing system or a wearable system of which camera is worn at the head and/or the cloth of a user. Therefore, the present invention is effective.

The invention claimed is:

1. An image capturing processing method comprising:
a first step of capturing an image by a camera;
a second step of detecting, in an upper region of the image captured in the first step, feature data of the image and calculating a correction amount from the feature data; and
a third step of performing, based on the correction amount calculated in the second step, correction control of an optical system of the camera or correction of image data of the image,
wherein the second step includes the steps of:
extracting a perpendicular edge element in the upper region;
detecting, as the feature data, a roll amount of the image based on the perpendicular edge element; and
calculating a roll correction amount of the image based on the roll amount detected at two or more times,
wherein the second step includes the steps of:
detecting, in addition to the roll amount, a motion vector as the feature data in the upper region; and
calculating a motion correction amount of the image based on the motion vector.

* * * * *